(12) United States Patent
Gao et al.

(10) Patent No.: US 11,900,544 B2
(45) Date of Patent: Feb. 13, 2024

(54) LOW-POLY MESH GENERATION FOR THREE-DIMENSIONAL MODELS

(71) Applicant: Tencent America LLC, Palo Alto, CA (US)

(72) Inventors: Xifeng Gao, Bellevue, WA (US); Kui Wu, Los Angeles, CA (US); Zherong Pan, Bellevue, WA (US)

(73) Assignee: TENCENT AMERICA LLC, Palo Alto, CA (US)

(*) Notice: Subject to any disclaimer, the term of this patent is extended or adjusted under 35 U.S.C. 154(b) by 91 days.

(21) Appl. No.: 17/737,951

(22) Filed: May 5, 2022

(65) Prior Publication Data

US 2023/0360328 A1    Nov. 9, 2023

(51) Int. Cl.
*G06T 17/20* (2006.01)
*G06T 15/20* (2011.01)

(52) U.S. Cl.
CPC .......... *G06T 17/205* (2013.01); *G06T 15/205* (2013.01); *G06T 2210/12* (2013.01)

(58) Field of Classification Search
None
See application file for complete search history.

(56) References Cited

PUBLICATIONS

Boyer et al., "A Hybrid Approach for Computing Visual Hulls of Complex Objects." Proceedings of the IEEE Conference on Computer Vision and Pattern Recognition, Jun. 2003, Madison, Wisconsin, USA, United States. IEEE Computer Society Press, pp. 695-701, 2003. (Year: 2003).*
Paolo Cignoni, Marco Callieri, Massimiliano Corsini, Matteo Dellepiane, Fabio Ganovelli, and Guido Ranzuglia. 2008. MeshLab: an Open-Source Mesh Processing Tool. In Eurographics Italian Chapter Conference, Vittorio Scarano, Rosario De Chiara, and Ugo Erra (Eds.). The Eurographics Association, Salerno, Italy, pp. 129-136.
Zhongshi Jiang, Teseo Schneider, Denis Zorin, Daniele Panozzo. Bijective Projection in a Shell. ACM Transactions on Graphics (In Proceedings of SIGGRAPH Asia 2020), pp. 1-18.
Pedro Sander, Xianfeng Gu, Steven Gortler, Hugues Hoppe, John Snyder. Silhouette clipping. ACM SIGGRAPH 2000 Proceedings, 327-334.

(Continued)

*Primary Examiner* — Nicholas R Wilson
(74) *Attorney, Agent, or Firm* — ARENTFOX SCHIFF LLP

(57) ABSTRACT

In a method, a visual hull is generated based on intersections of first 3D primitives of a plurality of first silhouettes with a bounding box of a 3D model. The first silhouettes are generated by projecting the 3D model onto planes perpendicular to a number of selected view directions of the 3D model. Each of the first 3D primitives is obtained by extruding a connected loop of a respective first silhouette along a view direction of the number of selected view directions that is associated with the respective first silhouette. A carved mesh is be generated based on subtractions of second 3D primitives derived from positive parts of the 3D model to carve out redundant structures from the visual hull. The positive parts are obtained based on fitting planes that slices the 3D model. A low-poly mesh sequence is generated based on progressive simplifications of the carved mesh.

20 Claims, 17 Drawing Sheets

(56) References Cited

PUBLICATIONS

Marco Attene, Daniela Giorgi, Massimo Ferri, Bianca Falcidieno. On converting sets of tetrahedra to combinatorial and PL manifolds. Nov. 2009, Computer Aided Geometric Design, 26(8):850-864.

Lorenzo Diazzi and Marco Attene. 2021. Convex Polyhedral Meshing for Robust Solid Modeling. ACM Trans. Graph. 40, 6, Article 259 (Dec. 2021), 16 pages.

Radu Bogdan Rusu and Steve Cousins. 2011. 3D is here: Point Cloud Library (PCL). In IEEE International Conference on Robotics and Automation (ICRA). IEEE, Shanghai, China, 1-4.

Bala R. Vatti. 1992. A Generic Solution to Polygon Clipping. Commun. ACM 35, 7 (Jul. 1992), 56-63.

David Cohen-Steiner, Pierre Alliez, and Mathieu Desbrun. 2004. Variational shape approximation. ACM Trans. Graph. 23, 3 (Aug. 2004), 905-914.

Liangliang Nan and Peter Wonka. 2017. PolyFit: Polygonal Surface Reconstruction from Point Clouds. In 2017 IEEE International Conference on Computer Vision (ICCV). IEEE, Venice, Italy, 2372-2380.

Michael Garland and Paul S. Heckbert. 1997. Surface Simplification Using Quadric Error Metrics. InProceedings of the 24th Annual Conference on Computer Graphicsand Interactive Techniques (SIGGRAPH '97). ACM Press/Addison-Wesley PublishingCo., USA, 209-216.

Remeshing – InstaLOD, https://instalod.zendesk.com/hc/en-us/articles/360016273779-Remeshing, 2020.

The standard in 3D games content optimization. Simplygon. Retrieved May 5, 2022, from https://www.simplygon.com/.

* cited by examiner

Input 1 (2599, 0)  PolyFit (44, 0.300)  Ours (40, 0.051)

Input 2 (98128, 0)  PolyFit (64, 0.753)  Ours (114, 0.137)

LOW-POLY MESH GENERATION FOR THREE-DIMENSIONAL MODELS

TECHNICAL FIELD

The present disclosure describes embodiments generally related to computing methodologies, including mesh geometry models.

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Three-dimensional (3D) models, such as building models, are important assets that make up the metaverse for virtual reality. Building modelers typically focus on creating a nice-looking appearance instead of other aspects such as a clean topology and connected geometry. A highly detailed building model can have complicated topology and geometry properties, such as disconnected components, open boundaries, non-manifold edges, and/or self-intersections. However, it can be expensive to render detailed building models all the time and some devices, such as lower-end platforms, may have more limited computing resources that limit the generation of a detailed mesh. The level-of-details (LOD) technique can be used to improve run-time performance. For example, instead of using a highly detailed (or high-poly) 3D model, a low-element-count (low-poly) mesh can be rendered at a distant view. Accordingly, there is a need for effective and robust solutions to generate low-poly meshes.

SUMMARY

Aspects of the disclosure include methods, apparatuses, and non-transitory computer-readable storage mediums for computing methodologies. In some examples, an apparatus for generating mesh geometry models includes processing circuitry.

According to an aspect of the disclosure, a method of generating a low-poly mesh sequence for a three-dimensional (3D) model is provided. In the method, a visual hull can be generated based on intersections of first 3D primitives of a plurality of first silhouettes with a bounding box of the 3D model. The plurality of first silhouettes can be generated by projecting the 3D model onto planes perpendicular to a number of selected view directions of the 3D model. Each of the first 3D primitives can be obtained by extruding a connected loop of a respective first silhouette along a view direction of the number of selected view directions that is associated with the respective first silhouette. A carved mesh can be generated based on subtractions of second 3D primitives derived from positive parts of the 3D model to carve out redundant structures from the visual hull. The positive parts can be obtained based on a plurality of fitting planes that slices the 3D model. The low-poly mesh sequence can be generated based on progressive simplifications of the carved mesh.

In the method, a plurality of fitting planes can be formed, where each region of the 3D model can be included in a respective fitting plane of the plurality of fitting planes. A plurality of candidate view directions can be determined. Each of the plurality of candidate view directions can be parallel to a respective pair of fitting planes and associated with a respective weight value. The respective weight value can be equal to a sum of areas of the regions of the 3D model included in the respective pair of fitting planes. The number of selected view directions can be determined from the plurality candidate view directions that are associated with top k weight values, where k can be a positive integer.

In some embodiments, each of the plurality of first silhouettes of the 3D model can be simplified through at least one of a 2D simplification or a shape-size filtering process. One or more hollow loops can be extracted from a respective one of the plurality of first silhouettes. One or more connected loops can be generated for the respective one of the plurality of first silhouettes by subtracting the one or more hollow loops from a 2D bounding box of the respective one of the plurality of first silhouettes. The first 3D primitives can be formed by extruding the one or more connected loops of the plurality of first silhouettes along the number of selected view directions.

In the method, to generate the visual hull, a first tentative visual hull can be formed by performing a Boolean intersection operation on a first one of the first 3D primitives and the bounding box of the 3D model. A first visual difference improvement can be determined based on the first tentative visual hull and the 3D model. In response to the visual difference improvement being larger than a threshold value, a second tentative visual hull can be formed by performing the Boolean intersection operation on a second one of the first 3D primitives and the first tentative visual hull. A second visual difference improvement can be determined based on the second tentative visual hull and the 3D model.

To determine the first visual difference improvement based on the first tentative visual hull and the 3D model, an initial visual difference can be determined based on an averaged pixel-wise difference between the bounding box of the 3D model and the 3D model. A first visual difference can be determined based on an averaged pixel-wise difference between the first tentative visual hull and the 3D model. The first visual difference improvement can subsequently be determined by subtracting the first visual difference from the initial visual difference.

In some embodiments, a n-th tentative visual hull can be determined as the visual hull in response to one of (i) a n-th visual difference improvement being smaller than the threshold value and (ii) the n is equal to an upper limit N. N can be a positive integer. The n-th tentative visual hull can be formed by performing the Boolean intersection operation on a n-th one of the first 3D primitives and a (n−1) th tentative visual hull.

In some embodiments, to form the carved mesh, the 3D model can be sliced by the plurality of fitting planes. Each of the plurality of fitting planes can slice the 3D model into a positive part and a negative part. The positive part of the 3D model can be positioned on a positive side of the respective one of the plurality of fitting planes. Each of the positive parts of the 3D model can be projected onto a corresponding fitting plane of the plurality of fitting planes to obtain a respective second silhouette. An enlarged bounding square of the respective second silhouette can be obtained on the corresponding fitting plane such that the respective second silhouette is included in the enlarged bounding square. A Boolean subtraction operation can be operated to subtract the respective second silhouette from the enlarged bounding square to obtain a boundary loop of the respective second silhouette. A second 3D primitive of the second 3D primitives can be formed by extruding the boundary loop of the respective second silhouette in a normal direction from the positive side of the fitting plane corresponding to the respective second silhouette.

In the method, to form the carved mesh, a first tentative carved mesh can be formed by performing a Boolean subtraction operation on a first one of the second 3D primitives and the visual hull. A first visual difference improvement can be determined based on the first tentative carved mesh and the 3D model. In response to the visual difference improvement being larger than a threshold value, a second tentative carved mesh can be formed by performing the Boolean subtraction operation on a second one of the second 3D primitives and the first tentative carved mesh. A second visual difference improvement can be determined based on the second tentative carved mesh and the 3D model.

In some embodiments, the carved mesh can be determined as a n-th tentative carved mesh in response to one of (i) a n-th visual difference improvement being smaller than the threshold value and (ii) the n is equal to a upper limit N, where the N can be a positive integer, and the n-th tentative carved mesh can be formed by performing a Boolean intersection operation on a n-th one of the second 3D primitives and a (n−1)th tentative carved mesh.

To generate the low-poly mesh sequence, an edge collapse and edge flip operation can be performed on the carved mesh progressively to generate the low-poly mesh sequence. Each of the low-poly meshes in the low-poly mesh sequence can include a respective number of triangles less than a user selected value T. T can be a positive integer, and a number of triangles of each of the low-poly meshes can be less than a number of triangles in the carved mesh.

In the method, the low-poly meshes in the low-poly mesh sequence can be ranked based on a number of faces and visual differences of the low-poly meshes to generate a pareto set.

According to another aspect of the disclosure, an apparatus is provided. The apparatus has processing circuitry. The processing circuitry can be configured to perform any one or a combination of the methods for generating mesh geometry models.

Aspects of the disclosure also provide a non-transitory computer-readable medium storing instructions which when executed by at least one processor cause the at least one processor to perform any one or a combination of the methods for generating mesh geometry models.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
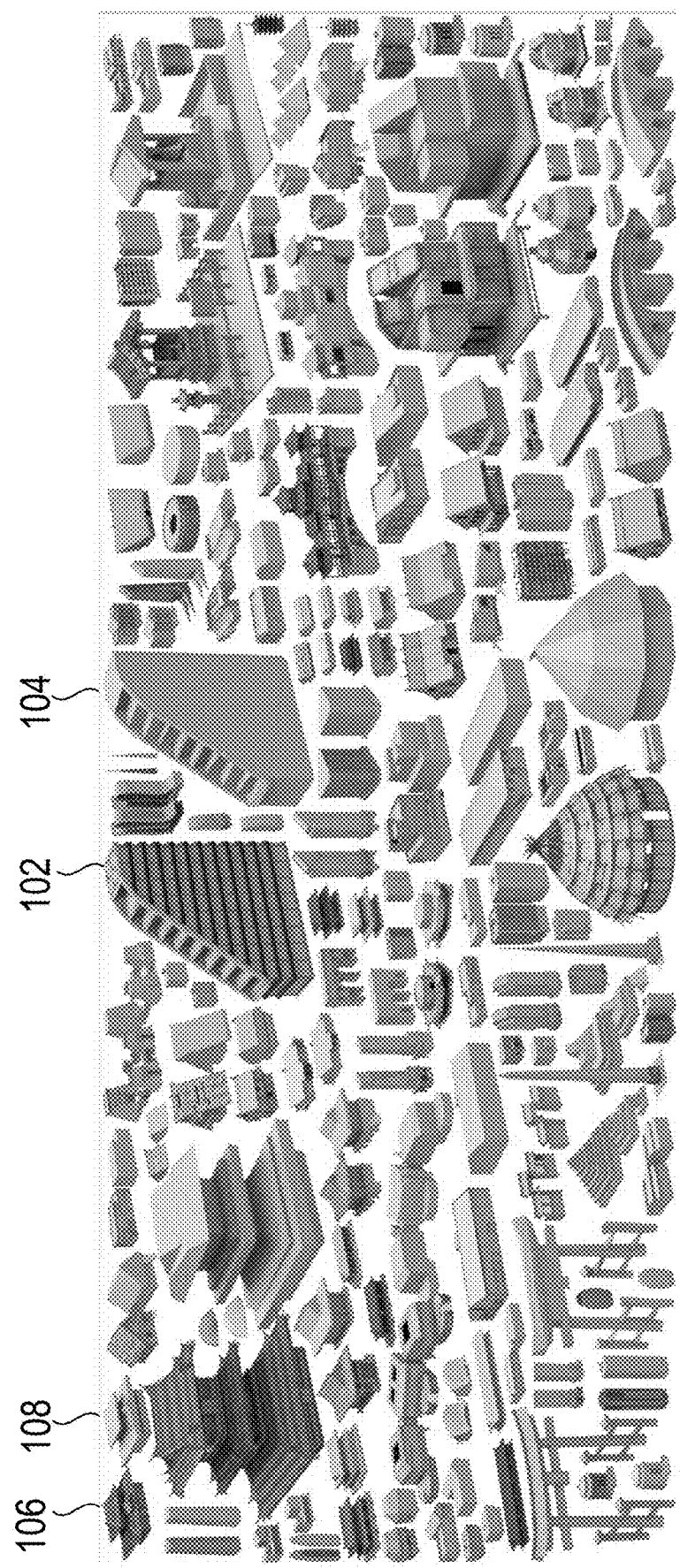
FIG. 1 shows examples of high-poly meshes and corresponding low-poly counterparts of the plurality of high-poly meshes.

FIG. 1 shows a plurality of exemplary building models. The building models can be used in various environments, such as virtual reality and gaming applications. As shown in FIG. 1, the plurality of exemplary building models (e.g., 102 and 106) can have complicated topologies and geometry properties.

Because it can be expensive to render detailed building models all the time, the LOD technique can be widely used to maximize the run-time performance, as noted above. For example, instead of using a highly detailed (or high-poly) 3D model, a low-element-count (low-poly) mesh can be rendered at a distant view. This would require the low-poly mesh to have a reasonably small element count while preserving the appearance of the high-poly model as much as possible.

Different methods can be used to create low-poly meshes from an input high-poly model, such as mesh simplification, reconstructing simple meshes from point clouds, voxelizing the high-poly mesh to remove small-scale details, and 3D reconstruction from images using machine learning. However, with the rising use of applications at lower-end platforms, such as mobile devices, the methods mentioned above may not be sufficient. For example, limited computing resources at mobile platforms may limit a detailed building mesh (or building model) such as to several thousand triangles, which are already considered as low-poly meshes by traditional LOD generation approaches, while the budget for the coarsest LOD is only a few hundred elements. To generate low-poly meshes, none of the related methods were found to perform well for a sample of building models, such as the building models shown in FIG. 1. Further, the standard process for creating such low-poly meshes is labor-intensive and involves tedious trial and error in the current game industry. For example, a common practice among game modelers is to manually craft low-poly meshes for given 3D building models in order to achieve a more ideal balance between a small element count and a visual similarity. However, this process can take hours and involve tedious trial and error. Thus, generating low-poly meshes for building models used by mobile applications is a challenging problem, for which effective and robust solutions are still elusive.

The present disclosure includes methods for generating low-poly meshes for effectively. The low-poly meshes can be used as the coarsest mesh in the LOD hierarchy. A visual metric can be defined firstly to qualitatively measure a visual difference between a low-poly mesh and a high-poly input mesh. Generation of the low-poly mesh can include three stages.

At the first stage, a coarse visual hull can be constructed. In an example, the coarse visual hull can be constructed by intersecting a small set of 3D primitives selected greedily by minimizing the visual metric. These 3D primitives can be generated by computing silhouettes of the input mesh from a number of view directions, decomposing the silhouettes into 2D solids and holes, and extruding the 2D shapes. The result of the first stage can be denoted as a visual hull. The visual hull can capture the input mesh's silhouette but can miss important concave features of the input mesh.

The second stage aims at carving a carved mesh from the visual hull. In an example, the carving is performed by subtracting redundant volumes to recover concave features of the input mesh. A greedy strategy can be deployed to select the carving primitives by minimizing the visual metrics between the carved mesh and the input mesh. When all the 3D primitives for constructing the visual hull and the redundant volumes are watertight and exact arithmetics are employed for computation, the generated carved mesh can be watertight and self-intersection-free.

The third stage can generate a mesh sequence from which the low-poly mesh is chosen. In an example, the mesh sequence is generated by progressively performing an edge-collapse and/or an edge-flip on the carved mesh.

In the third stage, high-quality low-poly meshes can occur indefinitely among the mesh sequence. Therefore, a history of the simplified meshes can be kept and the simplified meshes can be ordered into a Pareto set. The simplified meshes can be ordered with two objectives: the number of triangles and the visual closeness to the input mesh. An ideal mesh can be selected as the final result from the simplified meshes. The selection can be made by a user, such as a game modeler, or selected automatically according to one or more criteria.

The effectiveness and performance of related methods and the low-poly mesh generation disclosed herein were empirically compared based on a dataset containing one hundred building models with varying styles that are manually crafted by artists and used by real-world games. The low-poly mesh generation disclosed herein can exhibit a significant improvement, such as in achieving a low element count and/or high visual appearance preservation of the results.

Aspects of the disclosure include methods that can reduce the number of polygons in 3D models. The methods can be used to automate formation of low-poly meshes (or reduced poly meshes) by converting high-poly 3D models (e.g., building models) into both simple and visual preserving low-poly meshes. The methods can include three stages. First, a watertight, self-collision-free visual hull can be generated, for example via Boolean intersecting 3D extrusions of silhouettes of the input. Second, notable but redundant structures can be carved out from the visual hull, for example via Boolean subtracting 3D primitives derived from parts of the input. Third, a progressively simplified low-poly mesh sequence can be generated from the carved mesh. In some embodiments, the Pareto set can be extracted for users to select.

Stages of the formation of a low-poly mesh can be driven by visual metrics, aiming to preserve the visual similarity to the input mesh. Further, aspects of the present disclosure were tested based on a dataset containing 100 building models with different styles, most of which are used in popular digital games. Improvements in robustness and quality of the low-poly meshes are illustrated by comparisons with other low-poly meshing techniques. An exemplary dataset containing 100 building models (or input meshes) and corresponding low-poly meshes generated by the methods described herein is shown in FIG. 1. For example, a first building model 102 can have a corresponding low-poly mesh 104 and a second building model 106 can have a corresponding low-poly mesh 108.

Figure 2:
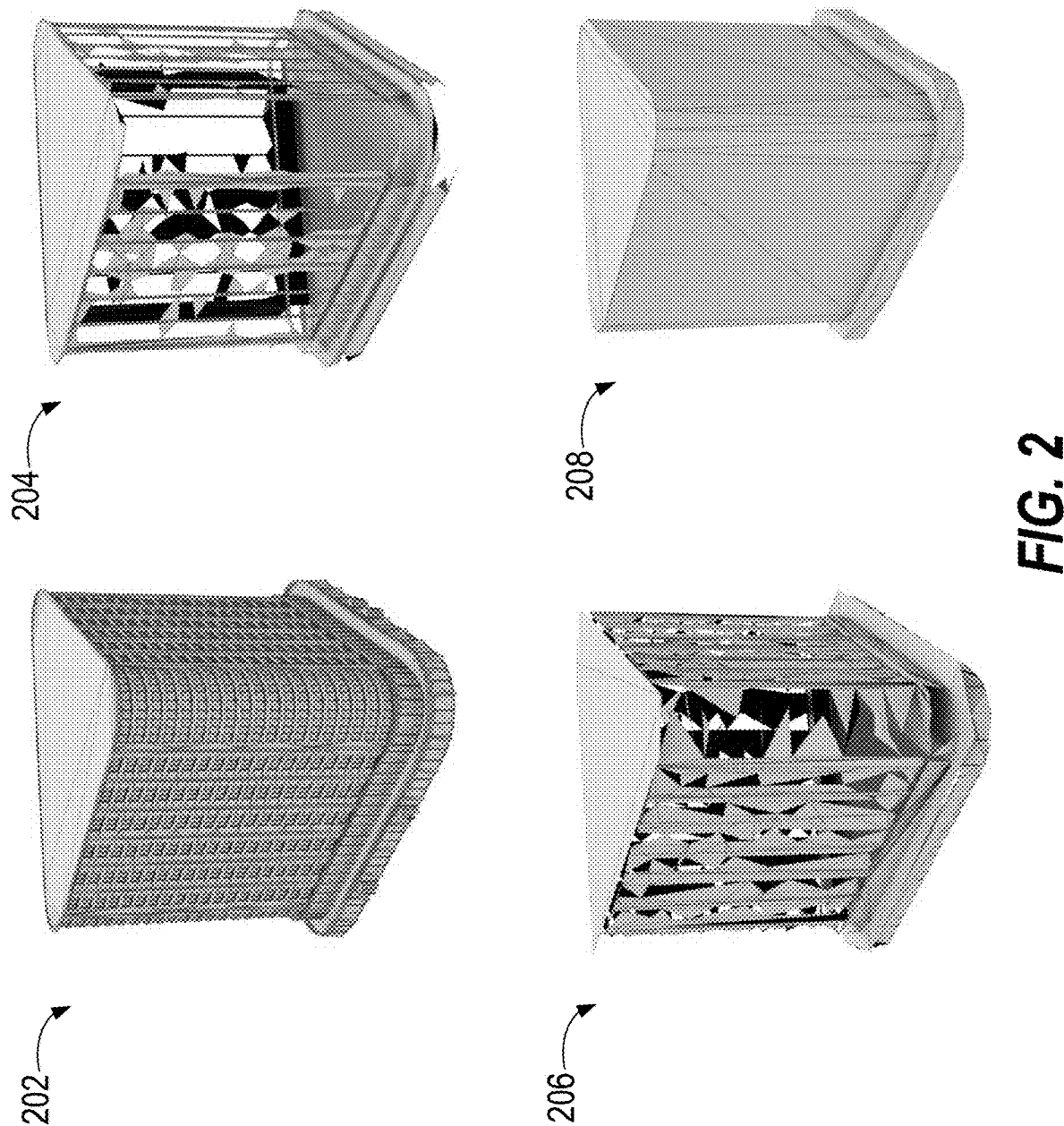
FIG. 2 is an example of a comparison of low-poly meshes generated according to different methods.

Mesh simplification includes a large group of methods that directly re-mesh raw inputs through progressively error guided element-removal operations, such as edge collapse, or segment the mesh into patches that can later be re-triangulated into a simplified mesh. These local remeshing operators are guided by a global, uniform error metric, which performs well when handling medium to high-poly meshes. However, these local operators do not work well on extreme coarse low-poly meshes and overly aggressive local remeshing can lead to salient, detrimental visual artifacts. FIG. 2 illustrates meshes with these artifacts that are generated using edge collapse guided by the Quadric Error Metrics (QEM) or the mesh reduction module in the commercial software Simplygon. As shown in FIG. 2, a simplified mesh 204 can be generated by applying the QEM on a building model 202. The building model 202 can function as an input mesh and can be a manifold model with 39620 triangles and 1894 disconnected components. FIG. 2 also shows a simplified mesh 206 that is generated by applying the Simplygon on the building model 202. As shown in FIG. 2, the QEM or the Simplygon can apply overly aggressive remeshing operators that can lead to salient artifacts with 1000 triangle. FIG. 2 further illustrates a low-poly mesh 208 generated by methods of the disclosure. The low-poly mesh 208 can more faithfully represent the overall structure of the building model 202 by using 128 triangles only.

Another type of approach is to voxelize the raw inputs and then apply feature-guided re-triangulation to generate low-poly outputs by assuming the input meshes are consistently oriented, i.e., come with a unique inside/outside definition. However, building models in games can be non-manifold, non-watertight, and self-intersecting, so the face orientations often have ill-defined inside and outside labeling even after mesh repairing. PolyFit is yet another approach to generate low-poly meshes. Given a point cloud, PolyFit first computes a set of planes, constructs a binary partition tree for all the planes to obtain sub-faces, and then selects the faces for the final output by solving a mixed-integer programming problem. Although PolyFit has successfully dealt with many dirty building models, a number of candidate sub-faces can get extremely large for models of practical complexity in practice, leading to intractably large mixed-integer programs.

A visual hull can be used to generate a 3D model. An object has a unique and well-defined visual hull, which is the maximal shape with the same silhouette as the object for any view directions. Visual hulls were originally used for 3D reconstruction from images or videos by considering the image boundaries as silhouettes. An advantage is that a visual hull can reconstruct watertight, topologically simple meshes from arbitrarily dirty inputs (e.g., input meshes having complicated topology and/or geometry properties). In standard applications of the visual hull, users typically prefer more views to capture as much detail as possible. Theoretically, an infinite number of views are needed for obtaining the exact visual hull from a general 3D model. In order to construct the exact visual hull using viewpoints inside the convex hull, an algorithm using $O(n^5)$ silhouettes can be used. The visual hull also has disadvantages. For example, concave features cannot be represented well. To tackle this issue, the visual hull can be constructed part-by-part via Boolean operations.

Figure 3:
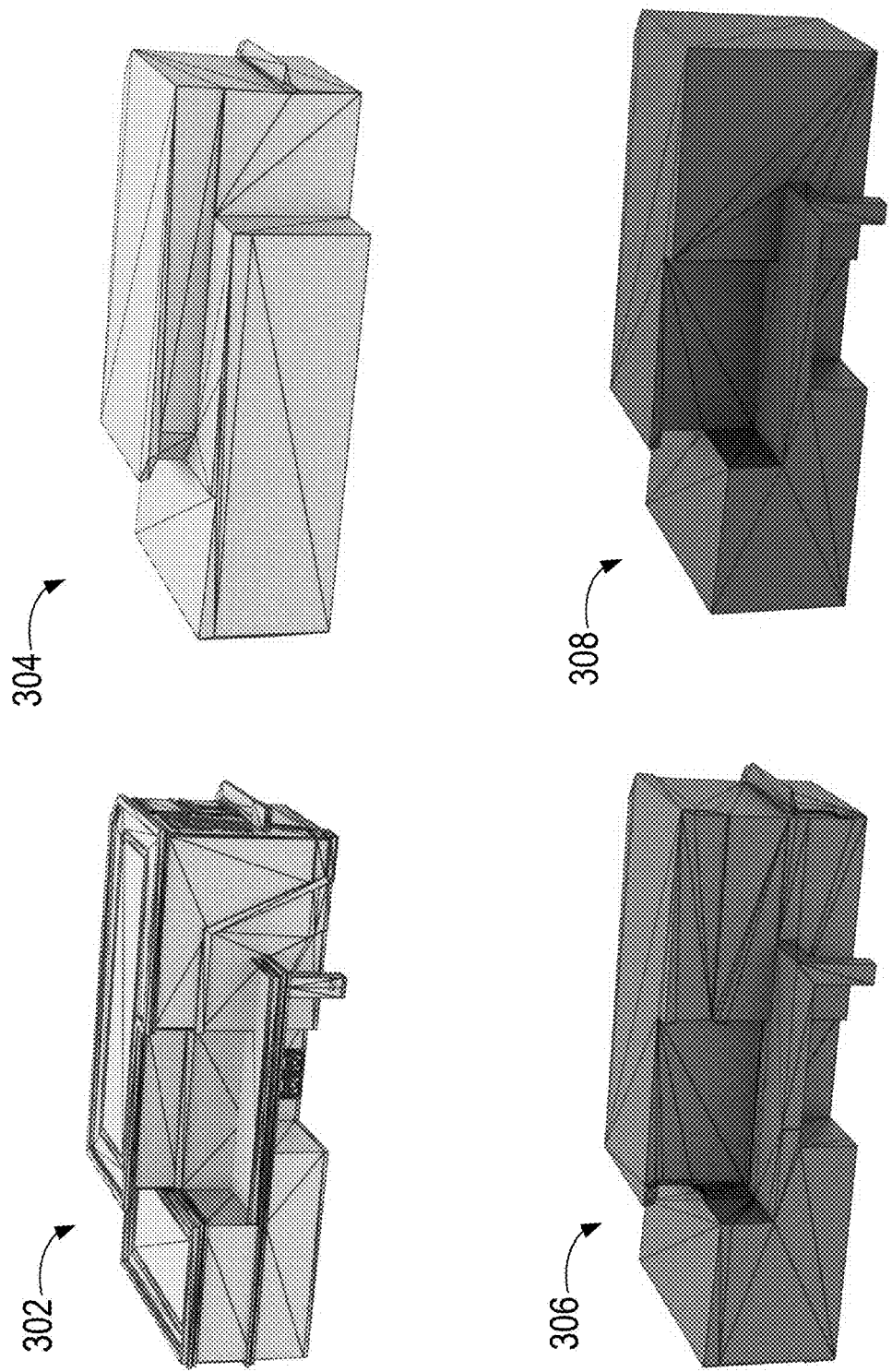
FIG. 3 shows exemplary outputs at various stages for generating a low-poly mesh.

Aspects of the present disclosure further include a visual metric to measure the quality of low-poly meshes, and an exemplary pipeline (or method) overview. An exemplary pipeline of the disclosure is illustrated in FIG. 3. FIG. 3 illustrates three stages for low-poly mesh generation. As shown in FIG. 3, given a topologically and geometrically dirty input mesh 302, a visual hull 304 can be constructed using a small set of greedily selected primitives such that the small set of greedily selected primitives can reduce a visual difference between the visual hull 304 and the input mesh 302. With such a small set, some concave features may be erroneously flattened. In order to correct the issue of missing concave features, a carved mesh 306 can be generated by carving concave features. The carving can be performed by using a set of carving primitives. The carved mesh 306 can further be simplified to a set of final output low-poly mesh candidates, such as a low-poly mesh 308.

Given a non-orientable, non-watertight, high-poly 3D building model $M_i$, one goal is to generate a low-poly mesh $M_o$ that can satisfy three qualitative requirements. To be used as the coarsest mesh in a LOD hierarchy, the visual appearance of $M_o$ should resemble that of $M_i$ from any faraway view points. To maximize the rendering efficacy, the number of geometric elements (e.g., faces) should be as few as possible. Further, the number of elements can be user-controllable. Finally, $M_o$ needs to be watertight to enable the automatic downstream mesh editing operations.

The visual metric can include an image-space metric that measures a visual difference between $M_i$ and $M_o$. Given a view direction d, a mesh can be rendered into an image space via perspective projection, which can be denoted as the operator $R_n$. $R_n(M, d)$ can render the three Cartesian components of the surface normal vector into a frame buffer, and the visual difference can be defined as an averaged pixel-wise distance in Equation 1:

$$d_n(M_i, M_o, d) = \|R_n(M_i, d) - R_n(M_o, d)\|/N \quad \text{Eq. (1)}$$

where N can be the number of pixels. A visual appearance metric can further be defined as a marginalized visual difference over all directions in Equation 2:

$$\Sigma n(M_i, M_o) \triangleq \int_{S^2} d_n(M_i, M_o, d(s)) ds \quad \text{Eq. (2)}$$

where S can be a sphere surface enclosing $M_i$ and $M_o$. $\tau_n$ can be approximated via Monte-Carlo sampling in practice.

To generate the low-poly mesh $M_o$, a visual hull $M_v$ can be computed from $M_i$, which can be both topologically consistent and geometrically clean, while capturing most of the silhouette information. Instead of directly mesh-simplifying $M_i$ itself, $M_v$ can be benign to (or compatible with) existing remeshing operators, geometrically a tighter bound of $M_i$ than its convex hull, and preserve $M_i$'s silhouette which is important for visual appearance. Then, redundant blocks can be subtracted from $M_v$ to obtain a carved mesh $M_c$. The $M_c$ can enrich the visual appearance with notable concave features. Finally, the carved mesh $M_c$ can be simplified to generate the low-poly output $M_o$.

Figure 4:
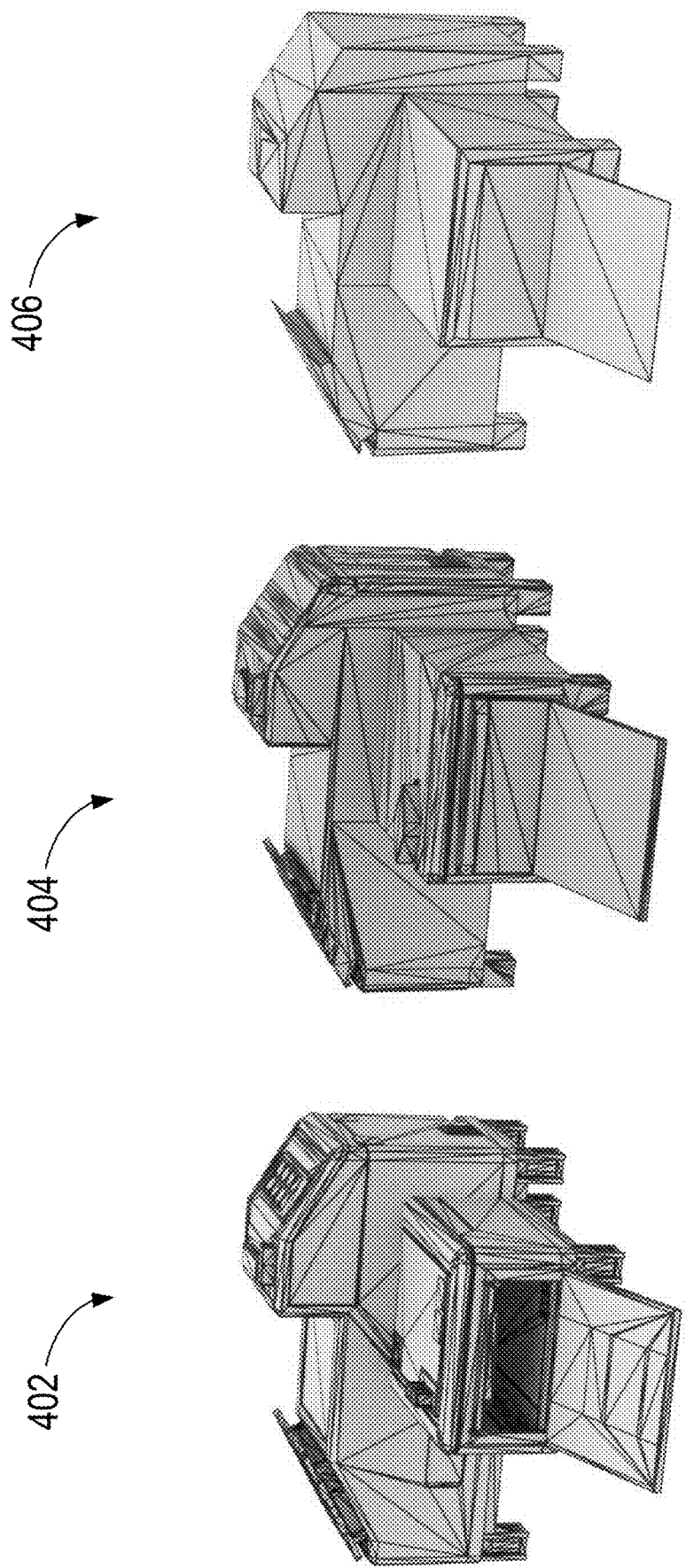
FIG. 4 shows exemplary visual hulls.

Generation of the low-poly mesh can include generating a visual hull. This stage aims to generate a topologically simple and geometrically clean visual hull while capturing the visual appearance of salient structures. However, as shown in FIG. 4, generating an exact visual hull 404 based on an input mesh 402 can lead to many small features and details. Instead, a simplified visual hull 406 can be generated. A simplified visual hull can be generated by carefully selecting and limiting the number of views for the visual hull. For example, the simplified visual hull can be generated based on Algorithm 1 below. As shown in FIG. 4, for the given input mesh 402, the exact visual hull 404 can be approximated by intersecting silhouettes from 13 view directions, leading to 277 k faces. In comparison, the visual hull 406 that is generated by the Algorithm 1 only has 368 faces, obtained by 3 primitives.

In Algorithm 1, for a given $M_i$, one silhouette for each of the top k view directions can be generated. Different from a related visual hull construction method, a self-intersection-free simplification can be performed in the 2D space for each silhouette. At this point, a visual hull can be constructed through the intersection of extruded silhouettes. Further, each of the silhouettes can be decomposed into connected 2D loops, and an extruded connected loop can be denoted as a primitive. Instead of considering a set of extruded silhouettes, a larger set of primitives can allow finer complexity control of the visual hull. Specifically, $M_v$ can be initialized as a bounding box of $M_i$ and a greedy algorithm can be applied to iteratively intersect My with a next-best primitive P through Boolean operations. Examples of each step can be described as follows.

---

Algorithm 1 Visual Hull Construction

---

Input: $M_i$, N, $\in_\tau$
Output: $M_v$
1: $P \leftarrow \emptyset$
2: Extracting a set of view directions and pick top k as D
3: for each $d \in D$ do
4:    Generate silhouette S along d
5:    Simplify silhouette S
6:    for each connected loop $L \in S$ do
7:       $P \leftarrow P \cup \{\text{Extrude}(L)\}$
8: $n \leftarrow 0$, $M_v \leftarrow \text{BBox}(M_i)$, $\tau \leftarrow \tau_s(M_v, M_i)$
9: while $n < N$ do       ▷ Maximal primitive count
10:    $\Delta\tau_{best} \leftarrow 0$, $P_{best} \leftarrow \emptyset$
11:    for each $P \in P$ do -continued Algorithm 1 Visual Hull Construction

```
12:       τ_p ← τ_s (Intersect (M_v, P), M_i)
13:       Δτ_p ← τ - τ_p
14:       if Δτ_p > Δτ_best then
15:           Δτ_best ← Δτ_p, P_best ← P
16:       if Δτ_best ≥ ∈_τ then                    ▷ Minimal primitive improvement
17:           M_v ← Intersect(M_v, P_best), P ← P / {P_best}
18:           n ← n + 1, τ ← τ - Δτ_best
19:       else Break
```

Construction of the visual hull can include the initialization of a primitive set. For example, at line 1 of Algorithm 1, an empty set can be assigned to a primitive set $\mathcal{P}$ as an initial value of the primitive set $\mathcal{P}$..

The construction of the visual hull can further include a determination of a view direction set. For example, at line 2 of Algorithm 1, a set of view directions can be extracted and top k view directions can be picked up into a view direction set $\mathcal{D}$.. For mesh simplicity, a limited number of view directions can be used to generate silhouettes and corresponding primitives, so the quality of the view directions would significantly impact the quality of $M_v$. For instance, ideal view directions for a cube should be parallel to the cube faces, along which a Boolean intersection with two extruded silhouettes would carve out the exact cube. Based on this observation, a four-stage strategy can be applied to extract potential view directions given $M_i$. First, triangles from each connected component can be grouped into regions. Triangles can be merged if their dihedral angle is close to π that is controlled by a threshold α. For example, two triangles may always be merged if their dihedral angle is close to π that is controlled by the threshold α. Next, a plane can be fitted for each region. The plane can be fitted for each region using a $\mathcal{L}^2$ metric and form a set of fitting planes $\mathcal{K}$.. For example, the $\mathcal{L}^2$ metric can be determined according to Equation 3:

$$\mathcal{L}^2(\mathcal{R}_i, P_i) = \iint_{x \in \mathcal{R}_i} \|x - \Pi_i(x)\|^2 dx \quad \text{Eq. (3)}$$

where $\mathcal{R}_i$ can be a given region; $P_i$ can be a proxy associated with the $\mathcal{R}_i$ and $P_i = (x_i, N_i)$; $\Pi_i$ can be denoted as an orthogonal projection on the proxy plan going through $x_i$ and normal to $N_i$.

For each pair of fitting planes in $\mathcal{K}_r$, the cross product of their normal directions would result in a direction parallel to both planes and the direction can be put into the view direction set $\mathcal{D}$.. Duplicated directions can be identified and avoided in some embodiments. For example, two directions $d_i$ and $d_j$ can be considered as duplicated if $|\cos(d_i, d_j)| \geq \cos β$, where β has a small pre-defined value. A weight can be associated with each view direction in $\mathcal{D}$, which equals to a sum of areas of the two planar regions that are included in the respective pair of fitting planes. Empirically, a higher weight can indicate that more surface regions can be captured by the silhouette. Therefore, the view direction set can be sorted by their weights and the top k directions can be picked up as the final direction set.

The construction of the visual hull can further include the computation of silhouettes. Silhouettes can be computed for each direction in the determined view direction set. For example, in line 4 of Algorithm 1, a silhouette S along direction d can be generated. To compute a silhouette from a view direction d, all faces of $M_i$ can be projected onto a plane perpendicular to the view direction d. A 2D Boolean union can then be used to obtain the corresponding silhouette shape, where the vertex coordinates can be represented by integers for fast and robust computation. The generated silhouette shape can be guaranteed to have no self-intersections.

The construction of the visual hull can further include simplification of one or more of the silhouettes. For example, at line 5 of Algorithm 1, a silhouette S can be simplified. Simplification of the silhouettes may be necessary because, even with a small number of view directions, the generated visual hull based on the small number of view directions can still contain too many small-scale details due to the complex silhouettes. Thus, each silhouette can be simplified through a 2D simplification and a shape-size filtering process for further complexity reduction. In other embodiments, one or more silhouettes can be simplified selectively. The selective simplification may be performed based on the number of small-scale details. The 2D simplification of the disclosure can be a global approach implemented using rational number arithmetic to generate self-intersection free silhouettes. The simplification can stop on a squared distance criterion $\in_d^2$. After simplification, each connected curve loop of the silhouette can be checked. If the area of a certain loop is less than $\in_a$, a threshold value, it is then filtered out.

Figure 5:
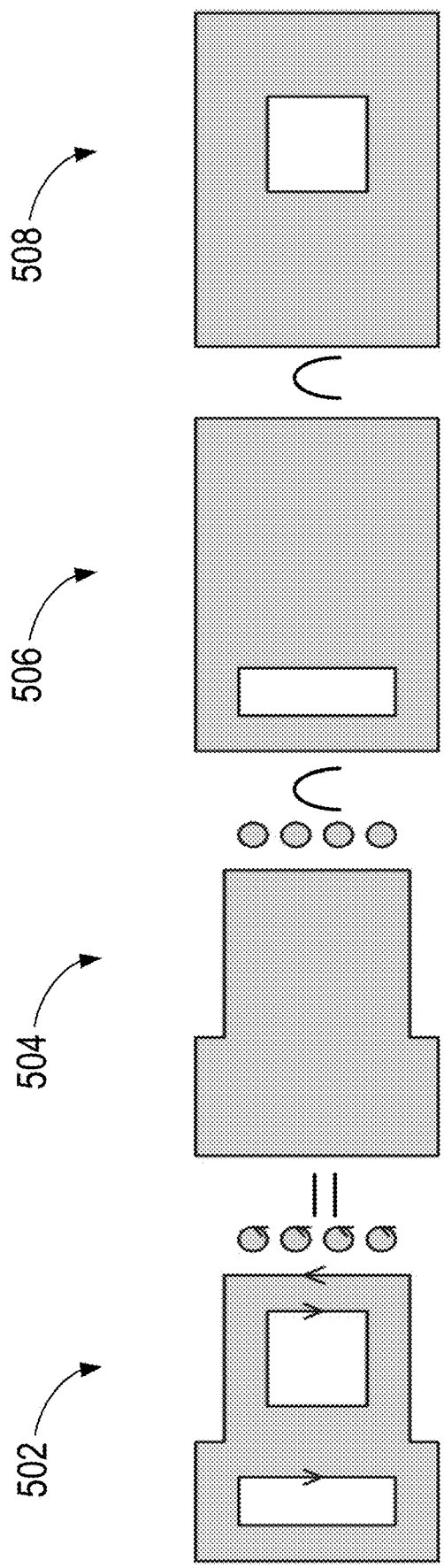
FIG. 5 shows an exemplary silhouette decomposition.

The construction of the visual hull can further include the generation of primitives. To derive the primitive set $\mathcal{P}$ from the silhouettes, boundary loops can be extracted from each of the silhouettes. For example, all boundary loops can be extracted for each of the silhouettes. Counterclockwise (ccw) loops can be marked as solid, and clockwise (cw) loops can be marked as hollow. As shown in FIG. 5, a silhouette 502 can include solid lines and hollow lines. The silhouette 502 contains five ccw loops and two cw loops. All the ccw loops can be merged into one outer loop and each cw loop can be converted into a separate loop by subtracting it from the 2D bounding box. This conversion can be lossless because the input silhouette can be recovered by Boolean intersecting all the loops. Further, this procedure can be order-independent. For example, at lines 6 and 7 of Algorithm 1, primitives can be generated. Solid loops can be merged into one ccw-loop in 504, while each hollow loop L can be separated out into a cw-loop (e.g., 506 and 508). The cw-loop can be determined by computing Subtract (BBox, L), where BBox is a 2D bounding box of the silhouette 502 and Subtract (•, •) is the Boolean subtraction operator. Finally, each loop (e.g., cw-loop 506 or 508) can be extruded along the view direction to derive a set of 3D primitives.

Figure 6:
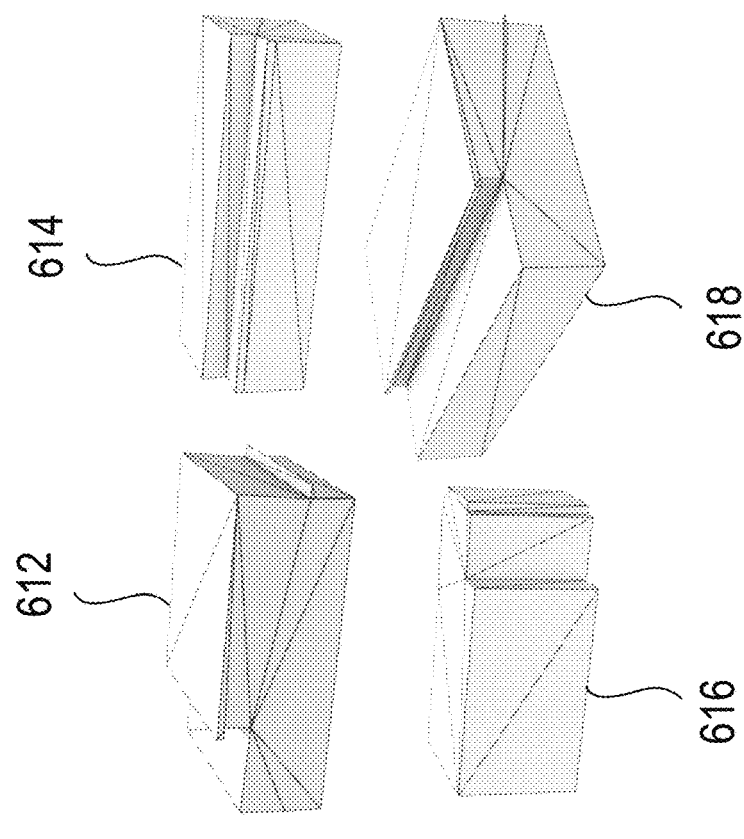
FIG. 6 shows an example of primitives generation based on connected loops of an input mesh.
Figure 6:
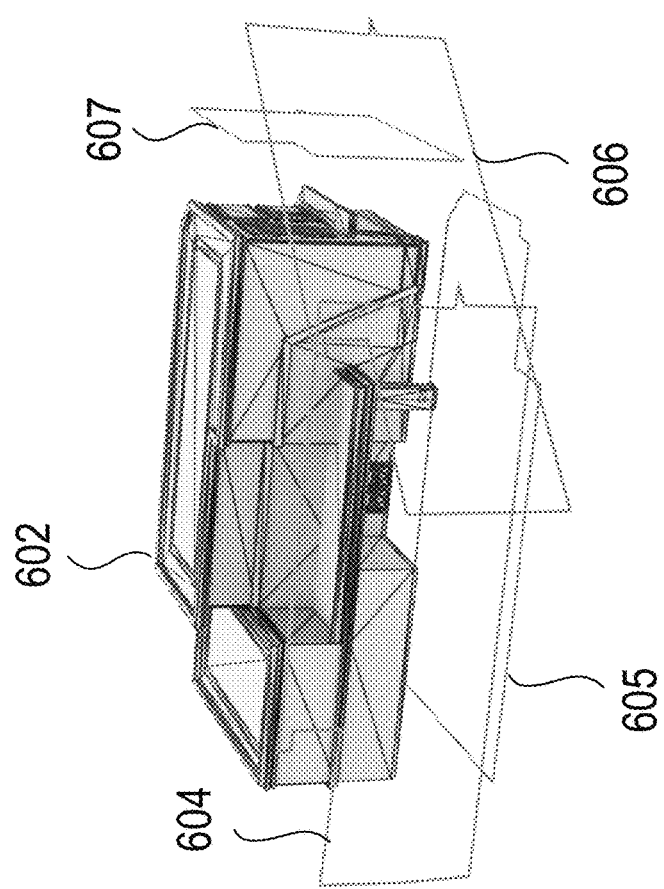

FIG. 6 shows an example of primitives generated from an input mesh. As shown in FIG. 6, a plurality of loops 604-607 can be extracted from the input mesh 602. Further, each of the loops can be extruded along a respective view direction to form a primitive. For example, a primitive 616 can be formed based on the loop 605, a primitive 618 can be formed based on the loop 606, a primitive 614 can be formed based on the loop 607, and a primitive 612 can be formed based on the loop 605.

At line 7 of Algorithm 1, the primitives (e.g., Extrude (L)) formed based on the loops extruded along the view directions can be assigned to the primitive set $\mathcal{P}$. At line 8 of the Algorithm 1, an iteration counting number n can be assigned with an initial value, such as zero. The visual hull $M_v$ can be assigned an initial value BBox ($M_i$) to form an initial visual hull, which can be a bounding box of the input mesh (or 3D model) $M_i$. An initial visual difference $\tau$ can be assigned with an initial value that is equal to a visual difference of the $M_i$ and the visual hull $M_v$ with the initial value BBox ($M_i$).

Between line 9 and line 19 of Algorithm 1, a Boolean intersection can be performed iteratively to intersect with a next-best primitive P until a stop criteria (e.g., a user-specified upper limit N or a user-specified threshold E T) is reached. As shown in line 9, when n is less than N, the user-specified upper limit, a next-best visual difference improvement $\Delta \tau_{best}$ can be assigned with an initial value, such as zero, and a next-best primitive $P_{best}$ can be assigned with an empty set at line 10.

The construction of the visual hull can include Boolean intersecting $P_{best} \in \mathcal{P}$, which can be greedily selected. To select the next-best primitive $P_{best}$, all the primitives $P \in \mathcal{P}$ can be traversed. Each primitive P can be intersected with a prior $M_v$ that is formed in a previous iteration to create a tentative mesh (e.g., Intersect ($M_v$, P)), where intersect (•, •) is the Boolean intersection operator. By measuring (or calculating) the visual difference between the tentative mesh and $M_i$, $P_{best}$ can be picked up as the primitive that can mostly decrease the visual difference improvement $\Delta \tau_p$. For example, at line 12 of Algorithm 1, a first visual difference $\tau_p$ can be obtained by determining the visual difference between $M_i$ and a first tentative mesh Intersect ($M_v$, P). The $M_v$ can be the initial visual hull and the P can be a first primitive in the primitive set $\mathcal{P}$. At line 13, a first visual difference improvement $\Delta \tau_P$ can be obtained by subtracting the first visual difference $\tau_p$ from the initial visual difference $\tau$. At line 14, when $\Delta \tau_P$ is larger than the next-best visual difference improvement $\Delta \tau_{best}$, the first visual difference improvement $\Delta \tau_P$ can be assigned to $\Delta \tau_{best}$, and the first primitive P can be assigned to as the next-best primitive $P_{best}$.

At line 16, if the next-best visual difference improvement $\Delta \tau_{best}$ is still larger than the user-specified threshold $\in_\tau$, it means there is still room for further improvement. Accordingly, at line 17, a first best tentative mesh Intersect ($M_v$, $P_{best}$) can be assigned to the $M_v$. The next-best primitive $P_{best}$ further can be removed from the primitive set $\mathcal{P}$ and the iteration process.

At line 18 of Algorithm 1, the iteration counting number n can be added by one and the initial visual difference $\tau$ can be reduced by the next-best visual difference improvement $\Delta \tau_{best}$. Because the $M_v$ is now updated with the first best tentative mesh Intersect ($M_v$, $P_{best}$), which can have a less visual difference from the input mesh $M_i$.

Line 19 of Algorithm 1 shows an example of stopping criteria. Stopping criteria that can be applied in Algorithm 1 for the visual hull construction can include a visual difference threshold and a number of selected primitives. First, if the improvement of the visual difference $\Delta \tau_p$ is smaller than the user-specified threshold $\in_\tau$, meaning there is barely any room for further improvement, the construction stops. Second, when the number of selected primitives (or the iteration counting number), n, reaches the user-specified upper limit N, the construction stops. Note that the parameter k can determine the number of view directions in $\mathcal{D}_v$, which further controls the total number of primitives in $\mathcal{P}$. After large-scale experiments, however, a strategy is to use a sufficiently large k, leaving enough search space for the greedy primitive selection algorithm to optimize $M_v$.

Note that Algorithm 1 applies a slightly different version of visual difference from $d_n$ for selecting primitives. The reason is that Algorithm 1 is focused on generating similar silhouettes rather than the geometry of the interior. Indeed, the mesh is flattened to the 2D plane, removing all the geometric features inside the silhouette. Therefore, another operator $R_s(M, d)$ can be provided, which can render the mesh M into a stencil buffer, binary masking the occluded pixels and discarding the normal information. Correspondingly, a visual silhouette difference $d_s$ can be defined in Equation 4 and a visual silhouette metric $\tau_s$ can be defined in Equation 5 as follows:

$$d_s(M_i, M_o, d) \triangleq \|R_s(M_i, d) - R_s(M_o, d)\|/N \qquad \text{Eq. (4)}$$

$$\tau_s(M_i, M_o) \triangleq \int_{s^2} d_s(M_i, M_o, d(s)) ds \qquad \text{Eq. (5)}$$

Note that since images are binary, computing d s amounts to perform a pixelwise XOR operator.

Figure 7:
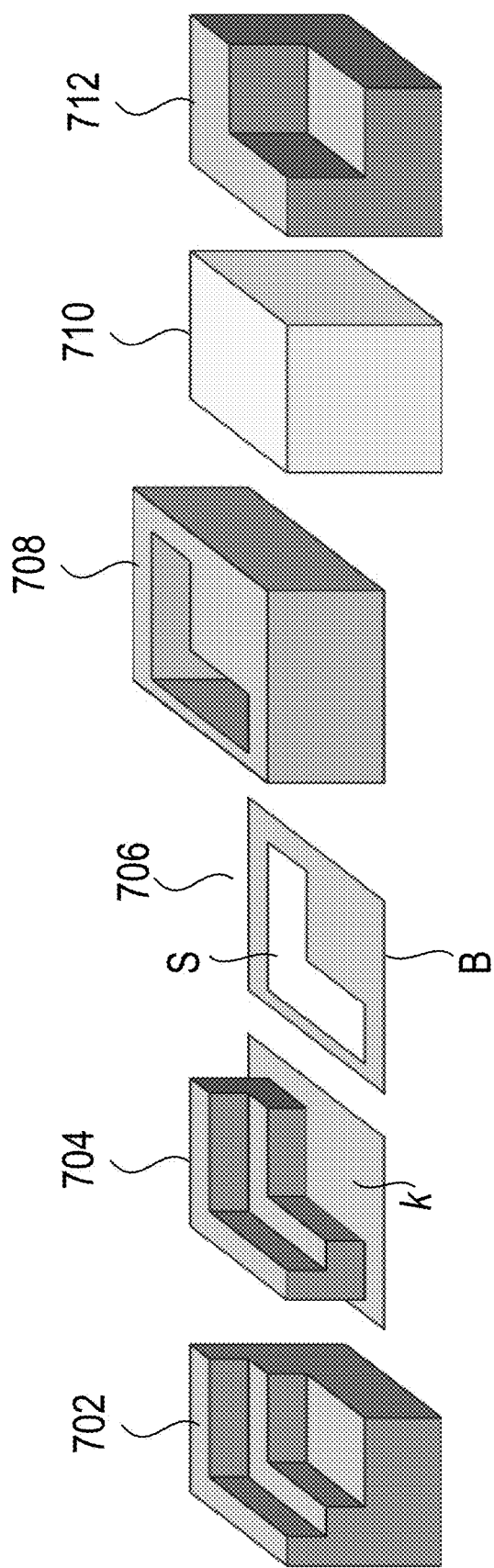
FIG. 7 shows an exemplary process of mesh carving.

Generation of the low-poly mesh can further include generating a carved mesh. The carved mesh can be generated from a visual hull $M_v$. The visual hull $M_v$ can be generated based on Algorithm 1 for example. In some embodiments, the visual hull can inherit the limitation of only capturing the silhouette while ignoring other features. As shown in FIG. 7, a visual hull $M_v$ 710 that is generated from the input mesh $M_i$ 702 can lose concave parts of the input mesh $M_i$ 702. To overcome this limitation, the visual hull $M_v$ can be refined into a carved mesh $M_c$ by carving out redundant volume blocks and further reducing the visual difference between $M_c$ and $M_i$.

The carved mesh can be generated by subtracting a plurality of primitives from the visual hull progressively. For example, the carved mesh can be generated based on Algorithm 2.

---

Algorithm 2 Carved Mesh Generation

---

Input: $M_i$, $M_v$, N, $\in_\tau$
Output: $M_c$

1: P ← ∅
2: Pick top k plane from K
3: for each K ∈ K do
4:     Cut $M_i$ and keep the positive part $M_i^{K+}$
5:     Generate the silhouette of $M_i^{K+}$ on K, denoted as S
6:     Simplify silhouette S
7:     Compute $M_i$'s extended 2D bounding square B on K
8:     P ← P ∪ { Extruder$_K^+$(Subtract (B,S)) }
9: n ← 0, $M_c$ ← $M_v$, $\tau$ ← $\tau_n$ ($M_c$, $M_i$)
10: while n < N do     ▷ Maximal primitive count -continued Algorithm 2 Carved Mesh Generation 11:    $\Delta\tau_{best} \leftarrow 0, P_{best} \leftarrow \emptyset$
12:    for each $P \in \mathcal{P}$ do
13:       $\tau_p \leftarrow \tau_n$ (Subtract ($M_c$, P), $M_i$ )
14:       $\Delta\tau_p \leftarrow \tau - \tau_p$
15:       if $\Delta\tau_p > \Delta\tau_{best}$ then
16:          $\Delta\tau_{best} \leftarrow \Delta\tau_p, P_{best} \leftarrow P$
17:    if $\Delta\tau_{best} \geq \epsilon_\tau$ then         ▷ Minimal primitive improvement
18:       $M_c \leftarrow$ Subtract ($M_c$, $P_{best}$), $P \leftarrow P / \{ P_{best}\}$
19:       $n \leftarrow n + 1, \tau \leftarrow \tau - \Delta\tau_{best}$
20:    else Break Algorithm 2 can include the following steps. First, as shown at line 2 of Algorithm 2, the top-k fitting planes in the fitting plane set $\mathcal{K}$ generated above can be sorted by corresponding region areas of the top-k fitting planes. At line 4, each fitting plane $k \in \mathcal{K}$ can be used to slice $M_i$ into two parts, such as a positive part and a negative part. The positive part positioned on the positive side can be stored and denoted as $M_i^{K^+}$ 704 in FIG. 7.

Figure 8:
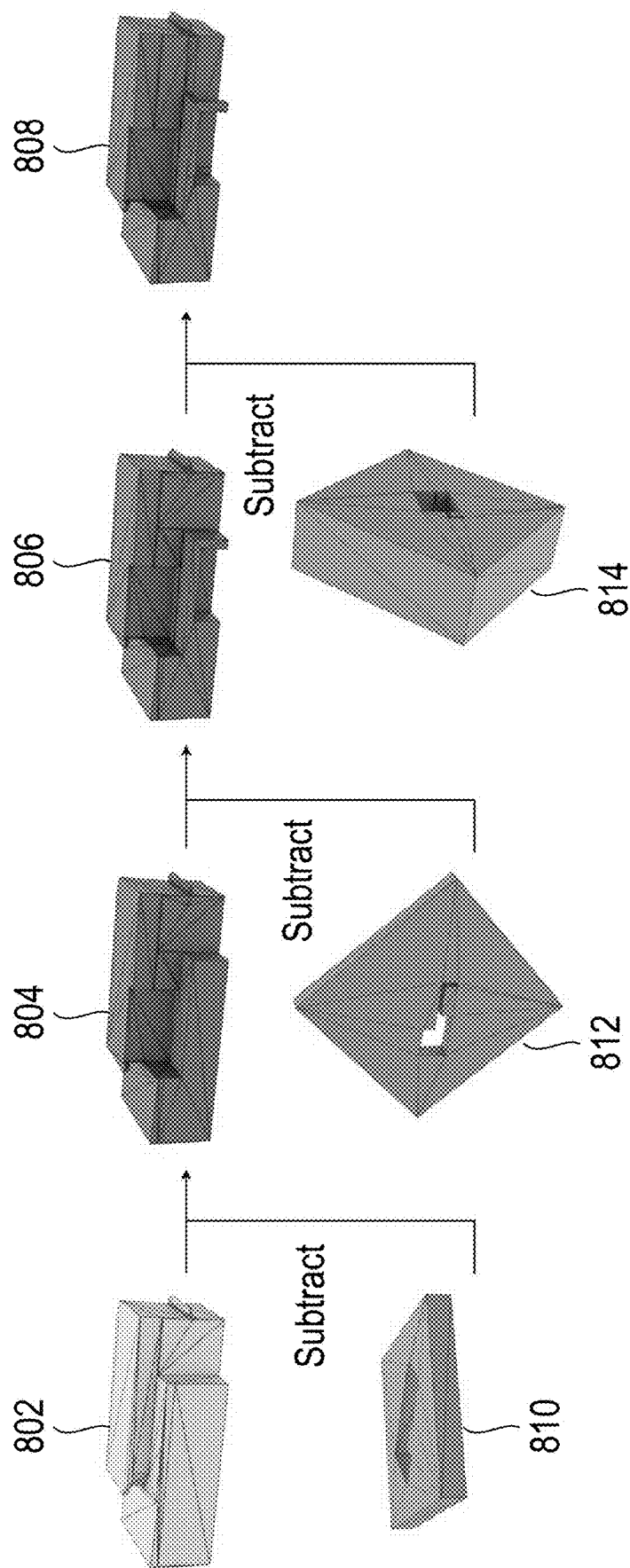
FIG. 8 shows an exemplary process of forming a carved mesh.

Next, at line 7 of Algorithm 2, the positive part $M_i^{K^+}$ can be projected onto the corresponding fitting plane k to obtain a silhouette S of the positive part $M_i^{K^+}$. An enlarged bounding square B of S can also be computed on k, which can be shown as 706 in FIG. 7. Finally, as shown at line 8 of Algorithm 2, a carving primitive P can be derived. For example, the carving primitive P can be derived according to Equation 6 as follows:

$$P \triangleq \text{Extrude}_K^+(\text{Substrate}(B,S)) \quad \text{Eq. (6)}$$

where $\text{Extrude}_K^+(\bullet)$ can be the extrusion operator along the positive side of the plane k. Note that B is set large enough to enclose the entire $M_v$'s silhouette on k so that the extruded primitive P 708 in FIG. 7 can include the entire volume of $M_v$, which is outside $M_i$. Similar to the visual hull generation, as shown at line 6 of Algorithm 2, the silhouette S can be simplified and regularized into regular profiles through a 2D simplification and a shape-size filtering process. Further, as shown between line 9 and line 20 of Algorithm 2, a carved mesh $M_c$ 712 in FIG. 7 can be generated by subtracting the primitive 708 from the visual hull $M_v$ 710 in FIG. 7. FIG. 8 shows an example of carving a visual hull to enrich the concave details by subtracting a plurality of primitives $P_0$, $P^1$, and $P^2$ from the visual hull $M_v$ (or $M_c^0$) progressively. As shown in FIG. 8, the visual hull $M_v$ (or $M_c^0$) 802 can subtract a first primitive $P^0$ 810 to obtain a first tentative carved mesh $M_c^1$ 804. The first tentative carved mesh $M_c^1$ 804 can include more concave details than the visual hull $M_v$. The first tentative carved mesh $M_c^1$ 804 can subtract a second primitive $P^1$ 812 to obtain a second tentative carved mesh $M_c^2$ 806. The second tentative carved mesh $M_c^2$ 806 can include more concave details than the first tentative carved mesh $M_c^1$ 804. The second tentative carved mesh $M_c^2$ 806 further can subtract a third primitive $P^2$ 814 to obtain a final carved mesh $M_c^3$ 808. The final carved mesh $M_c^3$ 808 can include more concave details than the second tentative carved mesh $M_c^2$ 806.

The overall structure of Algorithm 2 can be similar to that of Algorithm 1. The carved mesh $M_c$ can be constructed by selecting, for example greedily selection, $P_{best} \in \mathcal{P}$ as the candidate carving primitive. To identify $P_{best}$, all the primitives $P \in \mathcal{P}$ can be traversed and a tentative mesh (or Subtract ($M_c$, P)) can be created. By measuring (calculating) the visual difference between the tentative mesh and $M_i$, $P_{best}$ can be picked up as the primitive that can best decrease the visual difference. Stopping criteria can be used to terminate the carving process. For example, one or more of the same stopping criteria used in the visual hull construction can be used to terminate the carving process. When all the 3D primitives for constructing the visual hull and the redundant volumes are watertight, the generated carved mesh can also be watertight and self-intersection-free.

Generation of the low-poly mesh can further include generating the low-poly mesh based on a carved mesh. For example, the low-poly mesh can be generated based on the carved mesh $M_c$ generated according to Algorithm 2. After generation of a visual hull and carved mesh (e.g., forming the $M_v$ and $M_c$), the carved mesh can largely preserve the visual appearance of the input but may have more triangles than desired. The number of desired triangles may be determined by a user for example. Accordingly, the carved mesh can be simplified to obtain a low-poly mesh $M_o$ while maintaining a low visual difference from the input mesh $M_i$. For example, $M_c$ can be re-meshed progressively through edge collapse and/or edge flip operators. Thus, a first low-poly mesh can be generated by performing a first edge collapse and/or edge flip operation on the carved mesh $M_c$. Further, a second low-poly mesh can be generated by performing a second edge collapse and/or edge flip operation on the first low-poly mesh. Each of the edge collapse operators can reduce two triangles. Each of the edge collapse and edge flip operator can generate a respective low-poly mesh $M_o$. The operators can be performed until no more triangles can be removed. The operators can be performed until a certain number triangles are removed or remain in other embodiments. Further, only the meshes with numbers of triangles ≤T may be stored. T can be set to the largest element count users can tolerate. Thus, by performing the edge collapse and edge flip operators progressively, a low-poly mesh sequence can be formed. The low-poly mesh sequence can be displayed for user selection. The sequence may be displayed in a graphical user interface, for example.

Figure 9:
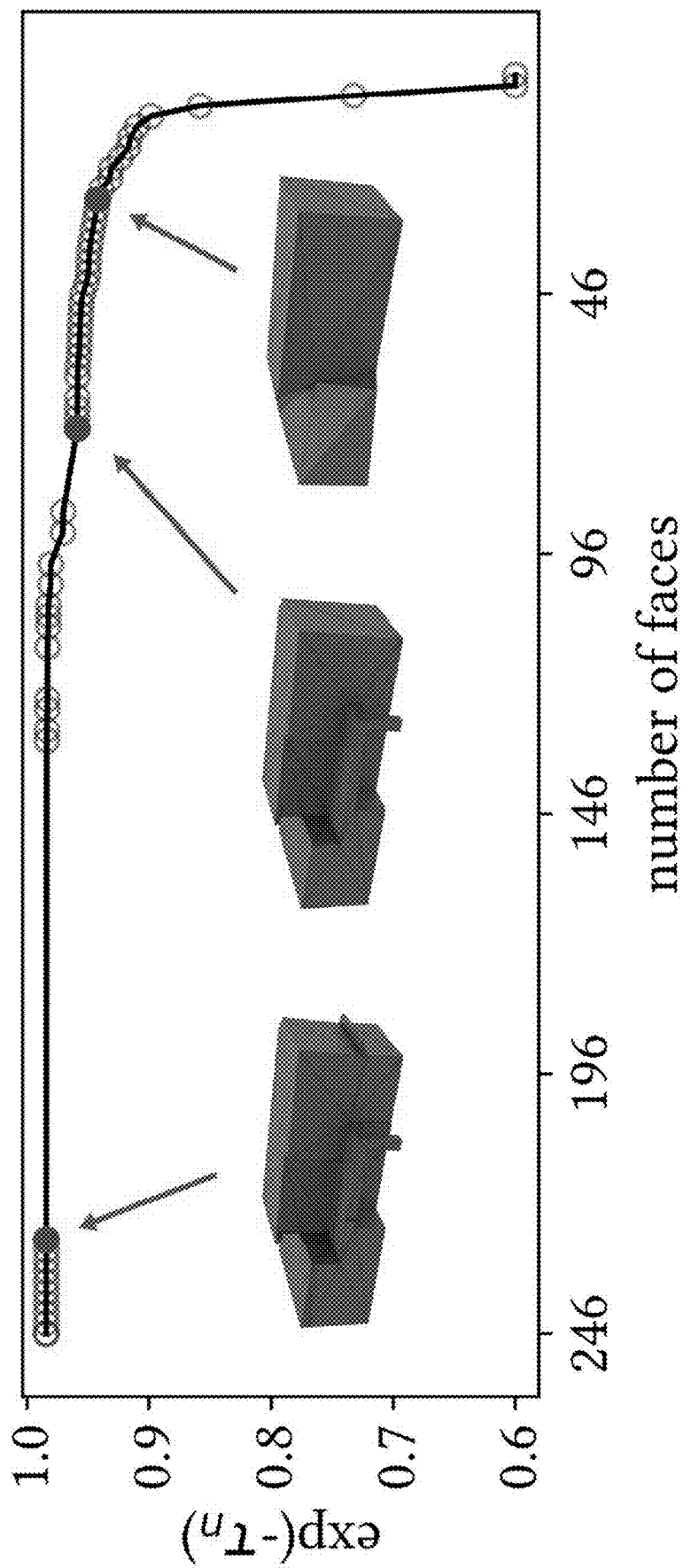
FIG. 9 shows an exemplary pareto set to rank low-poly meshes of a low-poly mesh sequence.

The low-poly mesh sequence can further be ranked in some embodiments. For example, the Pareto efficiency concept can be applied to rank the low-poly meshes in the low-poly mesh sequence. The ranking can be performed based on metrics, such as the number of faces and/or visual differences x. In some embodiments, the two metrics can be kept in the Pareto set, as illustrated in FIG. 9. Since picking $M_o$ from the low-poly mesh set often involves subjective factors in practice, the meshes in the Pareto set can be visualized through a Pareto set shown in FIG. 9. A user, such as a game modeler, thus can manually pick a $M_o$ as the output. A user may directly pick the $M_o$ from the low-poly mesh sequence without sorting in other embodiments. Note that, if desired, a mesh can also be automatically exported from the Pareto set right before an obvious increase of $\tau_n$.

For comparison purposes, Algorithms 1 and 2 were implemented in C++, using a GLSL shader for metric computation, Eigen for linear algebra routines, CGAL for rational number computations, the Clipper library for silhouette computations, and mesh arrangement encapsulated in libigl for 3D exact Boolean operations.

In the implementation, visual differences between any two meshes were computed using the GLSL shader. GLSL is a C-like language and tailored for use with graphics and contains useful features specifically targeted at vector and matrix manipulation. Given a view direction, a camera was set to be 3l-away from the meshes, where l is a max length of both meshes' bounding box. Each mesh was rendered to a 128×128 framebuffer, and $d_s$ and $d_n$ was computed using Equation 4 and Equation 1, respectively. $\tau_n$ and $\tau_s$ were evaluated by repeating the process for C uniformly distributed view directions on $S^2$. Building models were assumed to be always pointing upwards, so the $S^2$ is a half-sphere surface. The number of view directions and its influence on corresponding visual metrics was also evaluated. The metric values converge when C≥250. To be conservative, C was set as $10^3$ for the experiments described below.

During the re-meshing of the third stage (e.g., forming the $M_o$) of the pipeline, an edge collapse and an edge flip were executed iteratively, while maintaining the topology of $M_c$. For an edge collapse, QEM was employed to rank all the edges and add a virtual perpendicular plane with a small weight for each edge to fight against coplanar degeneracy, which is a common numerical instability in QEM. An edge flip was performed if any adjacent triangles of an edge had an obtuse angle larger than $\theta_\pi$ or if the dihedral angle of an edge was larger than $\theta_{2\pi}$, where $\theta_\pi$ is a threshold close to $\pi$ and $\theta_{2\pi}$ is a threshold close to $2\pi$.

Regarding the hyper parameters in the implementation of the disclosure, the following default parameter settings were used: $\alpha=175°$, which controls the number of regions generated from $M_i$; $\beta=1°$, which is the threshold for two directions to be considered duplicated; k=50 for choosing the view direction set during the generation of the visual hull, and the slicing plane set during the generation of the carved mesh; $\theta_\pi=175°$ and $\theta_{2\pi}=355°$ for edge flipping during the formation of the low-poly mesh. The stopping criterion Ed for silhouette simplification applied during the generation of the visual hull and the carved mesh was set to 1% of the maximal diagonal length of the bounding squares of all the silhouettes. The filtering process would discard all the loops with the area size less than 1% of the maximal area of the bounding squares of all the silhouettes.

Figure 10:
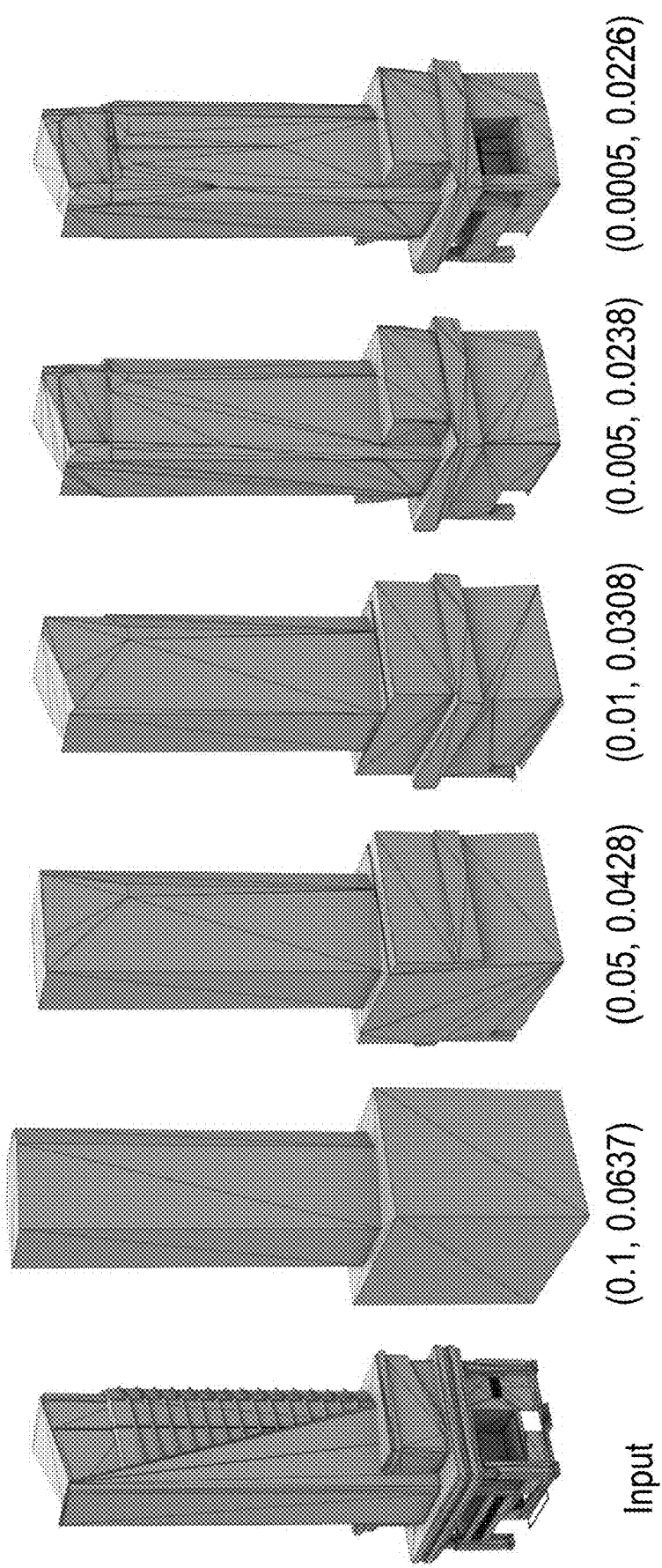
FIG. 10 shows examples of the impact of a stopping criteria on details of a carved mesh in accordance with an embodiment.

While both $\in_\tau$ and N can greatly affect the complexity of $M_v$, $M_c$, and therefore indirectly $M_o$. As illustrated in FIG. 10, a smaller stopping criteria of $\in_\tau$ can lead to $M_c$ with richer details, where (•, •) denotes ($\in_\tau$, $\tau_n$). However, $\in_\tau$ and N can be less intuitive for end-users to adjust. Thus, $\in_\tau$ and N was empirically set as $\in_\tau=1\times10^{-3}$ and N=20 by default. In practice, a single parameter can be exposed to users, which for example can be the maximal number of triangles T of the output low-poly mesh. In all experiments of the disclosure, T=600.

While various parameters and settings are described above for the exemplary implementation, it is noted that other settings and parameters can be utilized.

Experiments were run based on the implementation described above for comparison purposes. The experiments were run on a workstation with a 32-core Intel processor clocked at 3.5 Ghz and 64 Gb of memory, using OpenMP to parallelize the silhouette related computation and the candidate selection during the generation of the visual hull and the carved mesh.

For the dataset, 100 building models with various styles that commonly appear in digital images or environments, such as in games, were collected. Examples of the building models are shown in FIG. 1. The models in the dataset can have complex geometries and topologies, where 39% are non-manifold, and 88% are non-watertight. Of these models, the average number of triangles, intersected face pairs, and disconnected components are 20 k, 35.6 k, and 685, respectively. For models that are manifold, the average number of genus and holes are 136 and 640, respectively, where the genus can indicate the number of holes of a surface. Table 1 provides exemplary statistics of the input models that appear in FIGS. 2, 3, 6, 11A, 11B, 12A, 12B, 12C, 12D, and 13. FIG. 1 illustrates examples of both the building models (input meshes) and the low-poly meshes that can be generated based on methods of the disclosure for the entire dataset. Further, comparisons between the results generated by the related methods and the results generated by methods of the disclosure are illustrated in FIGS. 10, 11A, 11B, 12A, 12B, 12C, 12D, and 13, and Tables 1 and 2.

TABLE 1

Statistics for input models

| Models | $N_V$ | $N_F$ | $M_{an}$ | $N_G$ | Ns | $N_C$ | $N_H$ |
|---|---|---|---|---|---|---|---|
| 32 (FIG. 2) | 27k | 40k | Yes | 1 | 42k | 1894 | 2632 |
| 16 (FIG. 3) | 4k | 6k | No | — | 5k | 151 | — |
| 20 (FIG. 6) | 4k | 6k | Yes | 4 | 6k | 234 | 285 |
| 17 (FIG. 11A, $1^{st}$ input) | 3k | 4k | No | — | 5k | 150 | — |
| 95 (FIG. 11B, $2^{nd}$ input) | 13k | 30k | Yes | 891 | 5k | 34 | 0 |
| 3 (FIG. 12A, $1^{st}$ input) | 2k | 3k | No | — | 15k | 137 | — |
| 53 (FIG. 12B, $2^{nd}$ input) | 59k | 98k | Yes | 21 | 84k | 3233 | 1681 |
| 55 (FIG. 12C, $3^{rd}$ input) | 6k | 10k | Yes | 1 | 18k | 280 | 114 |
| 63 (FIG. 12D, $4^{th}$ input) | 6k | 10k | Yes | 0 | 6k | 99 | 135 |
| 43 (FIG. 13) | 5k | 10k | Yes | 3 | 14k | 151 | 34 |

As shown in Table 1, statistics for input models shown in FIGS. 2, 3, 6, 11A, 11B, 12A, 12B, 12C, 12D, and 13 are summarized, including number of vertices $N_V$, faces $N_F$, genus $N_G$, intersected face pairs $N_S$, components $N_C$, and holes $N_H$ and whether is a manifold $M_{an}$. Note that genus and holes are not well-defined for non-manifold mesh.

To evaluate the effectiveness of the mesh carving on preserving visual appearance, $\tau_n$ for both $M_v$ and $M_c$ of all 100 models were measured. Average $\tau_n$ ($M_v$) and $\tau_n$ ($M_c$) were 0.066 and 0.056, which shows the mesh carving can reduce the visual difference by 15.2% and is important for preserving the input's normal (or appearance).

Figure 11A:
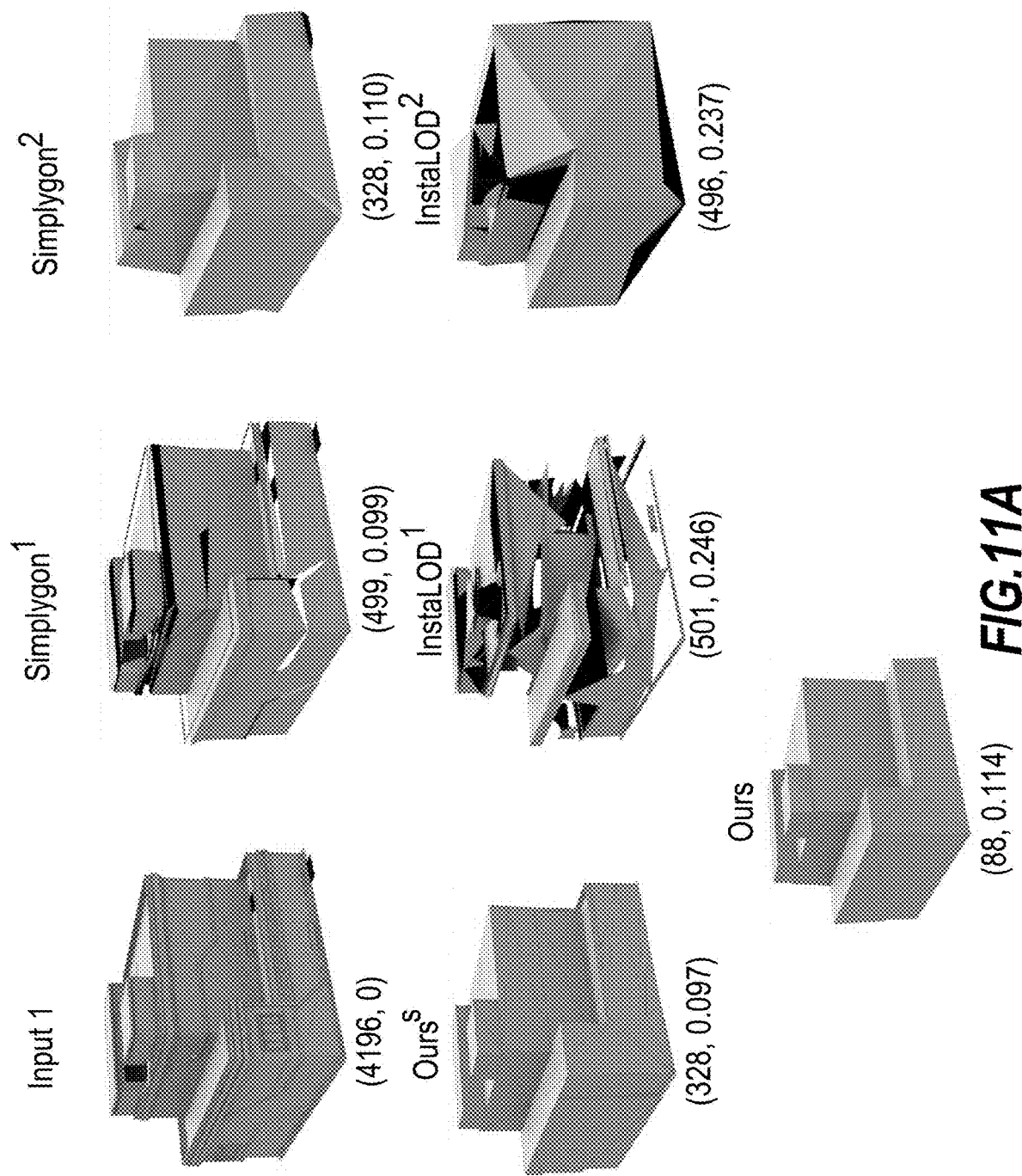
FIG. 11A shows comparisons of different methods for generating a first low-poly mesh in accordance with an embodiment.
Figure 11B:
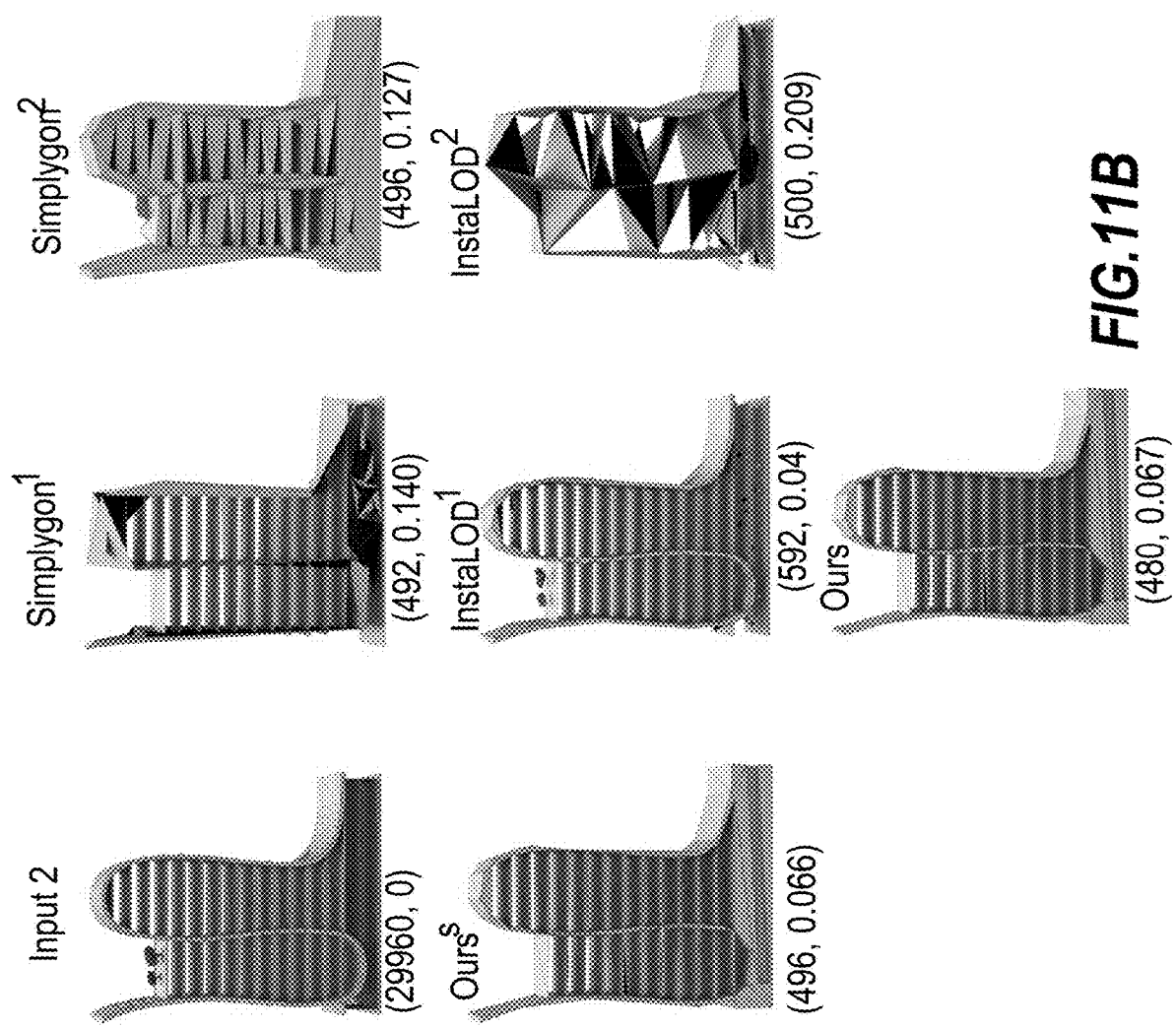
FIG. 11B shows comparisons of different methods for generating a second low-poly mesh in accordance with an embodiment.
Figure 12A:
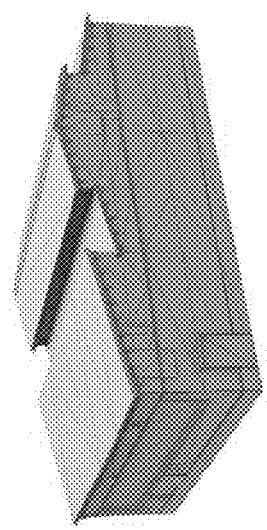
FIG. 12A shows comparisons of different methods for generating a third low-poly mesh in accordance with an embodiment.
Figure 12A:
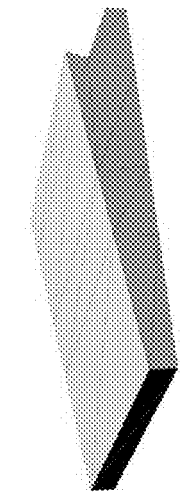
Figure 12A:
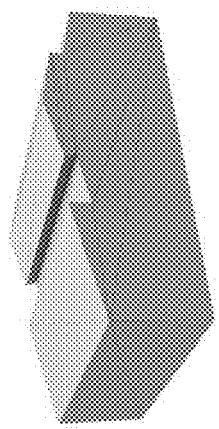
Figure 12B:
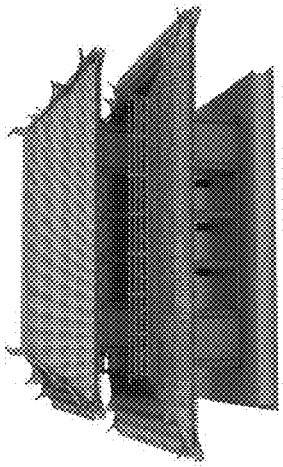
FIG. 12B shows comparisons of different methods for generating a fourth low-poly mesh in accordance with an embodiment.
Figure 12B:
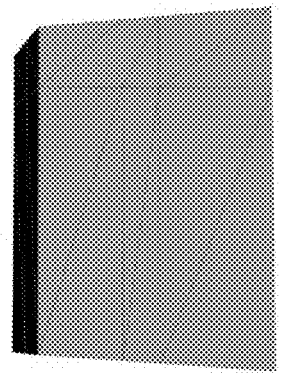
Figure 12B:
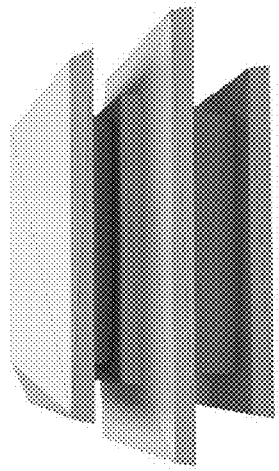
Figures 12C, 12D:
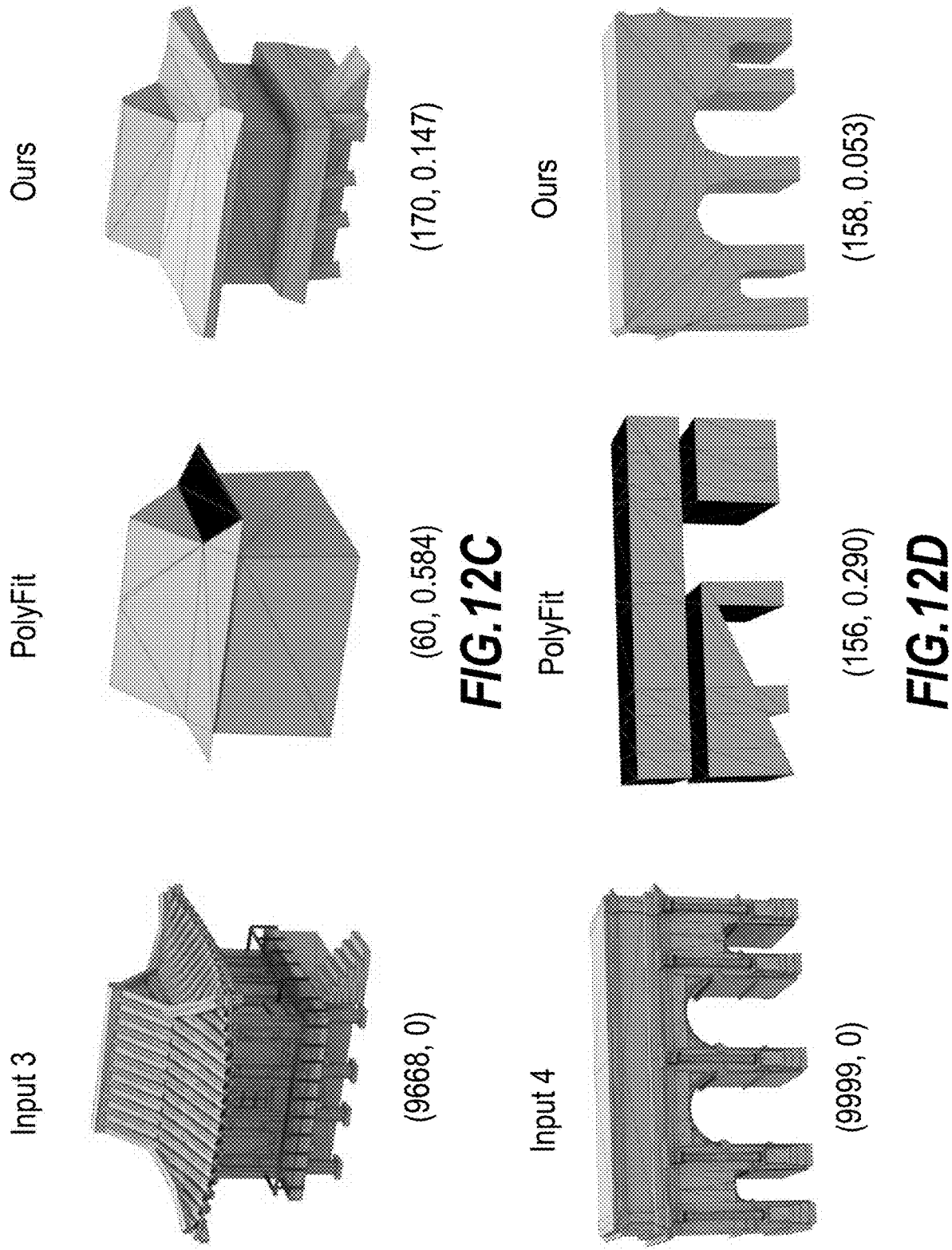
FIG. 12C shows comparisons of different methods for generating a fifth low-poly mesh in accordance with an embodiment.
FIG. 12D shows comparisons of different methods for generating a sixth low-poly mesh in accordance with an embodiment.

Comparisons were made to commercial software, such as InstaLOD and Simplygon, which are state-of-the-art commercial solutions that can automatically generate simplified meshes and are used by game studios. The results from InstaLOD and Simplygon are provided in Table 2 and FIGS. 11A and 11B. The results were generated using various modules that are provided by InstaLOD and Simplygon, including the InstaLOD optimization (InstaLOD[1]), the InstaLOD re-meshing (InstaLOD[2]), the Simplygon reduction (Simplygon[1]), and the Simplygon re-meshing (Simplygon[2]). Table 2 compares the results of low-poly meshes generated by methods of the disclosure with the results of InstaLOD and Simplygon in terms of the average and standard deviation of faces number, $\tau_s$, $\tau_n$, and the simplification rate. By default, a mesh from the Pareto front was manually picked up as a final result (or a final low-poly mesh). For fairness, the results of the methods of the disclosure (Ours[S]) were extracted from Pareto front with the face counts that match the face numbers of the meshes by Simplygon[2], because Simplygon[2] performs the best among the four modules provided by both InstaLOD and Simplygon. As shown in Table 2, the methods of the disclosure generate results having smaller element numbers and better visual appearance preservation. FIGS. 11A and 11B compare the four methods of the two software with the methods of the disclosure based on two sample models (or input meshes), where (•, •) denotes ($N_F$, $\tau_n$).

Further, comparisons were performed with PolyFit. PolyFit is an open-source state-of-the-art polygonal mesh reconstruction method. To employ PolyFit for low-poly meshing, each 3D model was uniformly sampled into a point cloud using a point cloud library by setting 1M point samples as the upper bound and $1\times10^{-4}$ of the diagonal length of its bounding box as the sampling interval. A batch process of the dataset was performed by the CGAL's implementation of PolyFit with the default parameter settings. PolyFit failed to produce any results for 9 models because not enough primitives were found. Results that were successfully handled by PolyFit are summarized and results (Ours[P]) of methods of the disclosure can be extracted by matching the face number of the results generated by PolyFit. FIGS. 12A, 12B, 12C, and 12D show exemplary comparisons between the results of the methods of the disclosure and the results of PolyFit, where (•, •) denotes (face number, TO. As illustrated by Table 2 and FIGS. 12A, 12B, 12C, and 12D, the results of the methods of the disclosure can preserve much more of the visual appearance than PolyFit with the same number of faces.

Figure 13:
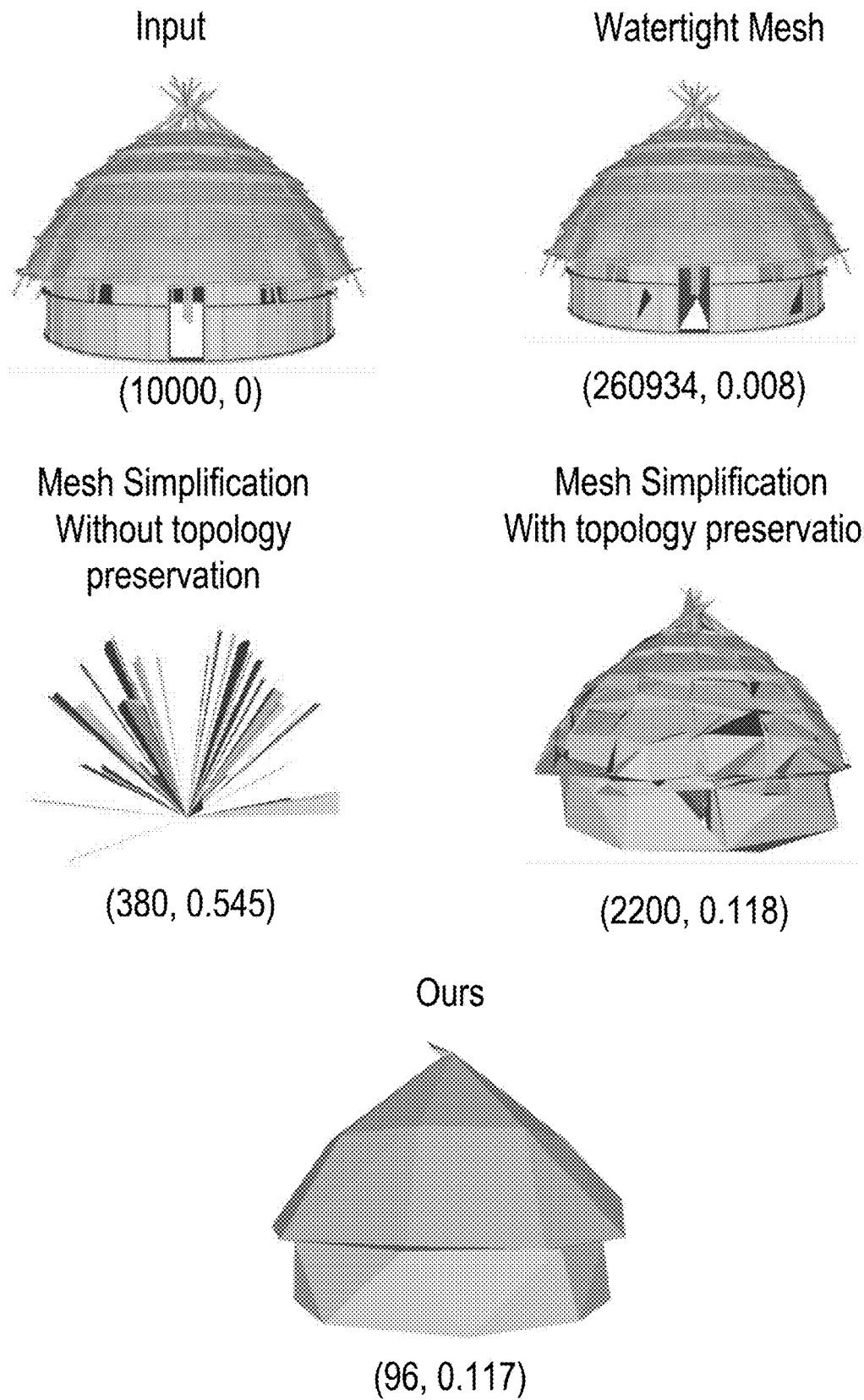
FIG. 13 shows comparisons of different methods for generating a seventh low-poly mesh in accordance with an embodiment.

Further, comparisons were made with alternative pipelines. To handle models with many open boundaries and self-intersecting elements, an alternative pipeline for generating simplified meshes is to apply mesh repairing first and then conduct re-meshing algorithms. The results of the methods of the disclosure were further compared with results generated by such a two-stage alternative pipeline: first generating a watertight mesh, and then applying QEM-guided mesh simplification using meshlab. FIG. 13 shows the comparison results of the watertight mesh, the mesh simplification without topology preservation, the mesh simplification with topology preservation, and the results of methods of the disclosure, where (•, •) denotes (face number, $\tau_n$). As demonstrated in FIG. 13, although mesh repairing approaches can repair the mesh to some extent, it is still difficult for local re-meshing operators to generate satisfactory results when the desired element count is small.

TABLE 2

Statistics of the results generated for the entire dataset

|  | W | $N_F^{Avg.}$ | $\tau_s^{Avg.}$ | $\tau_s^{SD}$ | $\tau_n^{Avg.}$ | $\tau_n^{SD}$ | $R^{Avg.}$ | $R^{SD}$ |
| --- | --- | --- | --- | --- | --- | --- | --- | --- |
| InstaLOD[1] | 17% | 527 | 0.0345 | 0.0448 | 0.0992 | 0.0929 | 0.1028 | 0.1210 |
| InstaLOD[2] | 97% | 499 | 0.0411 | 0.0490 | 0.1350 | 0.1006 | 0.1090 | 0.1480 |
| Simplygon[1] | 16% | 499 | 0.0368 | 0.0567 | 0.1019 | 0.1065 | 0.1092 | 0.1477 |
| Simplygon[2] | 100% | 206 | 0.0235 | 0.0088 | 0.0841 | 0.0427 | 0.0301 | 0.0325 |
| Ours[S] | 100% | 196 | 0.0147 | 0.0110 | 0.0660 | 0.0420 | 0.0290 | 0.0320 |
| PolyFit | 100% | 103 | 0.1382 | 0.1093 | 0.3576 | 0.1730 | 0.0192 | 0.0303 |
| Ours[P] | 100% | 103 | 0.0330 | 0.0440 | 0.0946 | 0.0735 | 0.0195 | 0.0310 |
| Ours | 100% | 152 | 0.0155 | 0.0118 | 0.0675 | 0.0465 | 0.0262 | 0.0437 |

As shown in Table 2, statistics of the results generated for the entire dataset are summarized, including percentage of results that are watertight W, average number of faces $N_F^{Avg.}$, average and standard deviation of silhouette difference, normal difference, and simplification ratio, respectively ($\tau_s^{Avg.}$, $\tau_s^{SD}$, $\tau_n^{Avg.}$, $\tau_n^{SD}$, $R^{Avg.}$, $R^{SD}$).

In the disclosure, an approach to generate a low-poly representation for commonly used 3D models is provided. The approach can be applied to digital games, which include building models for example. A feature of the disclosure is to rely on the visual hull to generate topologically simple proxy meshes. Exemplary algorithms are provided to construct and carve visual hulls using selected primitives for structural simplicity. However, modifications to one or more of the algorithms can be made in other embodiments. For example, the plane slicing during the subtraction step may produce unsatisfactory results for models with smooth concave features. In this case, if the input comes with consistent in/out labeling, other proxy representations such as voxelization can be used. When the desired number of triangles of the low-poly mesh is larger than 1K, traditional re-meshing methods such as QEM-guided edge collapsing and the commercial solutions may already be satisfactory. The methods of the disclosure can be designed for generating the coarsest level-of-detail in some embodiments.

Figure 14:
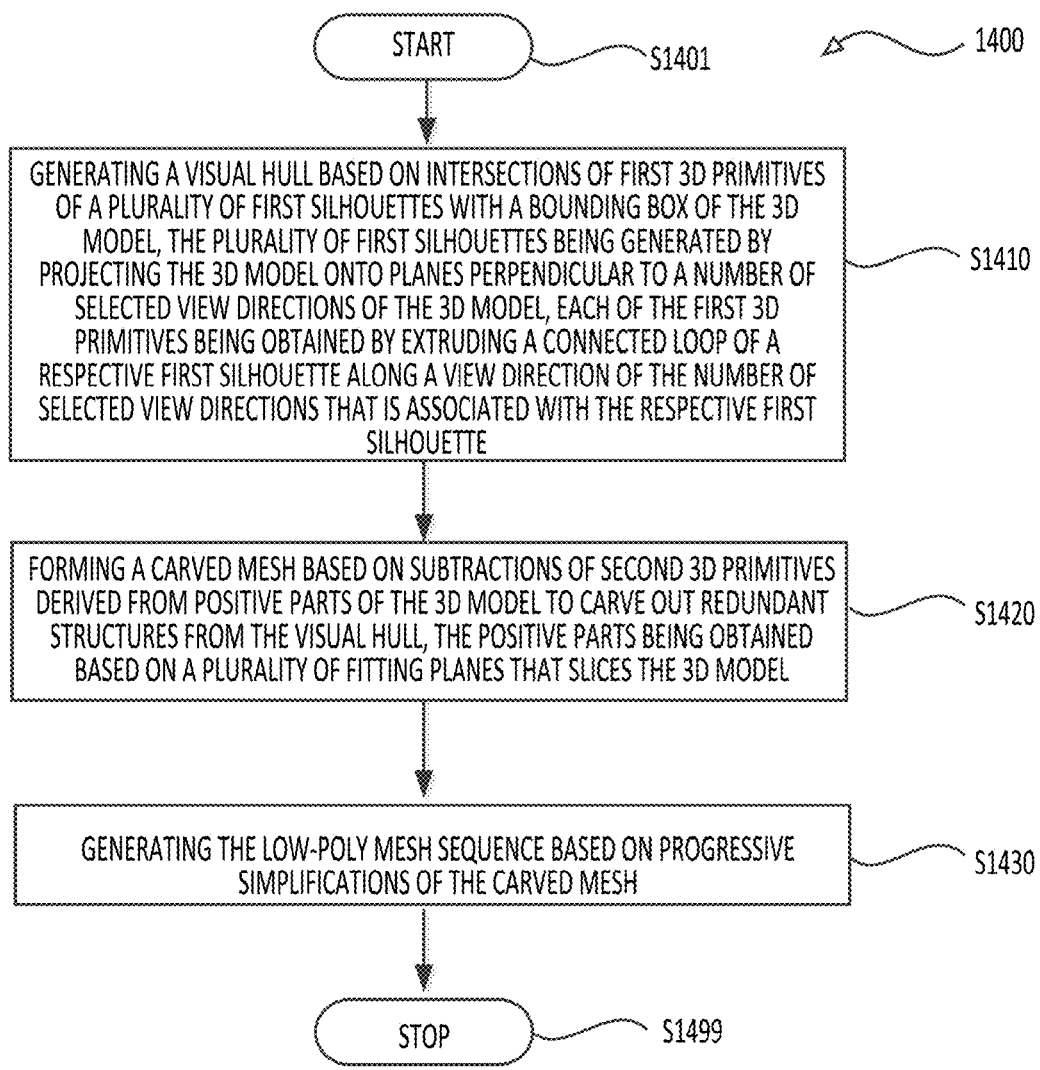
FIG. 14 shows a flow chart outlining an exemplary process to generate a low-poly mesh according to some embodiments of the disclosure.

FIG. 14 shows a flow chart outlining an exemplary process (1400) to generate a low-poly mesh sequence according to some embodiments of the disclosure.

As shown in FIG. 14, the process (1400) can start from (S1401) and proceed to (S1410). At (S1410), a visual hull can be generated. The visual hull can be generated based on intersections of first 3D primitives of a plurality of first silhouettes with a bounding box of the 3D model. The plurality of first silhouettes can be generated by projecting the 3D model onto planes perpendicular to a number of selected view directions of the 3D model. Each of the first 3D primitives can be obtained by extruding a connected loop of a respective first silhouette along a view direction of the number of selected view directions that is associated with the respective first silhouette.

At (S1420), a carved mesh can be generated. The carved mesh can be generated based on subtractions of second 3D primitives derived from positive parts of the 3D model to carve out redundant structures from the visual hull. The positive parts can be obtained based on a plurality of fitting planes that slices the 3D model.

At (S1430), the low-poly mesh sequence can be generated. The low-poly mesh sequence can be generated based on progressive simplifications of the carved mesh.

In the process (1400), a plurality of fitting planes can be formed, where each region of the 3D model can be included in a respective fitting plane of the plurality of fitting planes. A plurality of candidate view directions can be determined. Each of the plurality of candidate view directions can be parallel to a respective pair of fitting planes and associated with a respective weight value. The respective weight value can be equal to a sum of areas of the regions of the 3D model included in the respective pair of fitting planes. The number of selected view directions can be determined from the plurality candidate view directions that are associated with top k weight values, where k can be a positive integer.

In some embodiments, each of the plurality of first silhouettes of the 3D model can be simplified through at least one of a 2D simplification or a shape-size filtering process. One or more hollow loops can be extracted from a respective one of the plurality of first silhouettes. One or more connected loops can be generated for the respective one of the plurality of first silhouettes by subtracting the one or more hollow loops from a 2D bounding box of the respective one of the plurality of first silhouettes. The first 3D primitives can be formed by extruding the one or more connected loops of the plurality of first silhouettes along the number of selected view directions.

In the process (1400), to generate the visual hull, a first tentative visual hull can be formed by performing a Boolean intersection operation on a first one of the first 3D primitives and the bounding box of the 3D model. A first visual difference improvement can be determined based on the first tentative visual hull and the 3D model. In response to the visual difference improvement being larger than a threshold value, a second tentative visual hull can be formed by performing the Boolean intersection operation on a second one of the first 3D primitives and the first tentative visual hull. A second visual difference improvement can be determined based on the second tentative visual hull and the 3D model.

To determine the first visual difference improvement based on the first tentative visual hull and the 3D model, an initial visual difference can be determined based on an averaged pixel-wise difference between the bounding box of the 3D model and the 3D model. A first visual difference can be determined based on an averaged pixel-wise difference between the first tentative visual hull and the 3D model. The first visual difference improvement can subsequently be determined by subtracting the first visual difference from the initial visual difference.

In some embodiments, a n-th tentative visual hull can be determined as the visual hull in response to one of (i) a n-th visual difference improvement being smaller than the threshold value and (ii) the n is equal to an upper limit N. N can be a positive integer. The n-th tentative visual hull can be formed by performing the Boolean intersection operation on a n-th one of the first 3D primitives and a (n−1)th tentative visual hull.

In some embodiments, to form the carved mesh, the 3D model can be sliced by the plurality of fitting planes. Each of the plurality of fitting planes can slice the 3D model into a positive part and a negative part. The positive part of the 3D model can be positioned on a positive side of the respective one of the plurality of fitting planes. Each of the positive parts of the 3D model can be projected onto a corresponding fitting plane of the plurality of fitting planes to obtain a respective second silhouette. An enlarged bounding square of the respective second silhouette can be obtained on the corresponding fitting plane such that the respective second silhouette is included in the enlarged bounding square. A Boolean subtraction operation can be operated to subtract the respective second silhouette from the enlarged bounding square to obtain a boundary loop of the respective second silhouette. A second 3D primitive of the second 3D primitives can be formed by extruding the boundary loop of the respective second silhouette in a normal direction from the positive side of the fitting plane corresponding to the respective second silhouette.

In the process (1400), to form the carved mesh, a first tentative carved mesh can be formed by performing a Boolean subtraction operation on a first one of the second 3D primitives and the visual hull. A first visual difference improvement can be determined based on the first tentative carved mesh and the 3D model. In response to the visual difference improvement being larger than a threshold value, a second tentative carved mesh can be formed by performing the Boolean subtraction operation on a second one of the second 3D primitives and the first tentative carved mesh. A second visual difference improvement can be determined based on the second tentative carved mesh and the 3D model.

In some embodiments, the carved mesh can be determined as a n-th tentative carved mesh in response to one of (i) a n-th visual difference improvement being smaller than the threshold value and (ii) the n is equal to a upper limit N, where the N can be a positive integer, and the n-th tentative carved mesh can be formed by performing a Boolean intersection operation on a n-th one of the second 3D primitives and a (n−1)th tentative carved mesh.

To generate the low-poly mesh sequence, an edge collapse and edge flip operation can be performed on the carved mesh progressively to generate the low-poly mesh sequence. Each of the low-poly meshes in the low-poly mesh sequence can include a respective number of triangles less than a user selected value T. T can be a positive integer, and a number of triangles of each of the low-poly meshes can be less than a number of triangles in the carved mesh.

In the process (1400), the low-poly meshes in the low-poly mesh sequence can be ranked based on a number of faces and visual differences of the low-poly meshes to generate a pareto set.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by processing circuitry such as one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
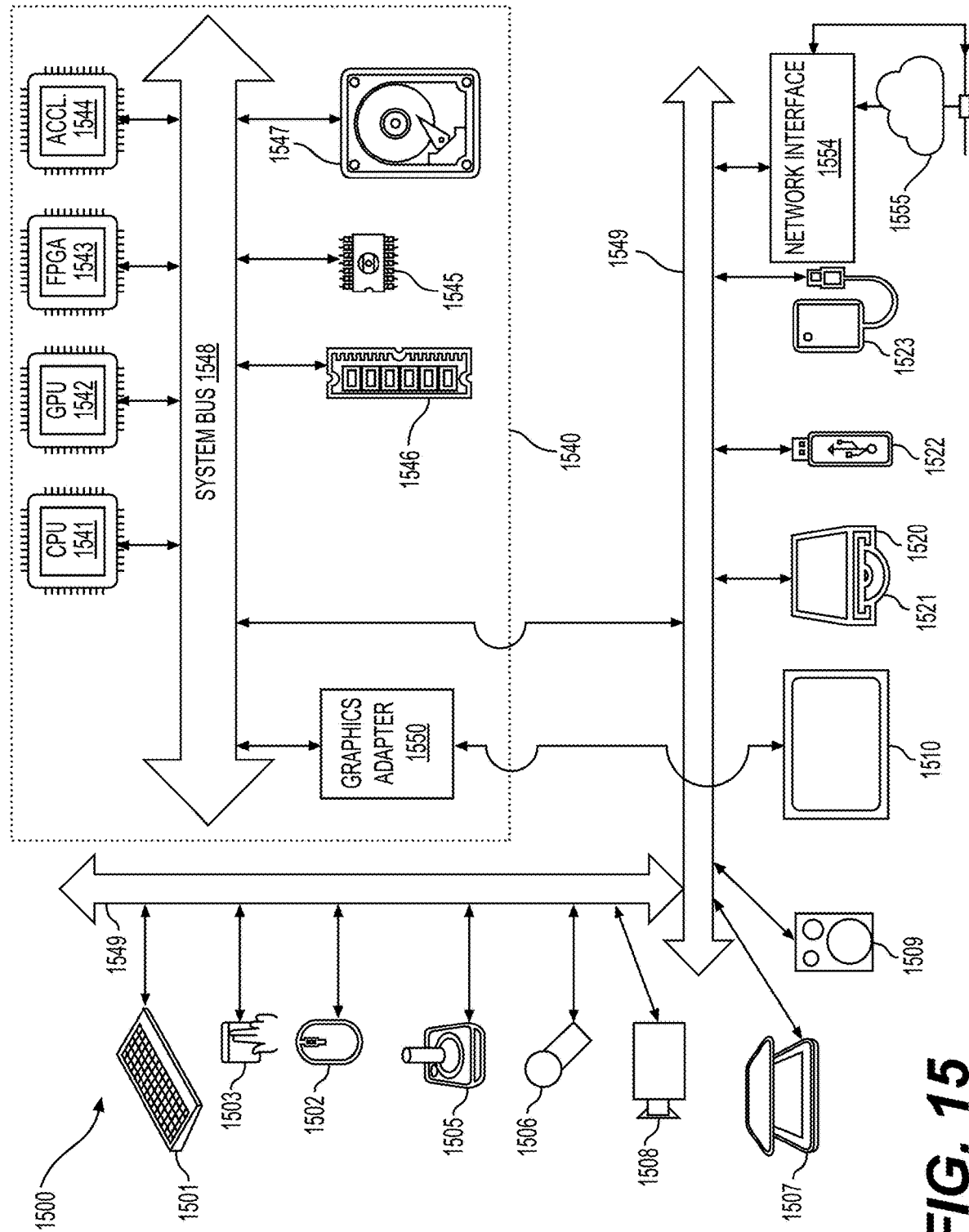
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "non-transitory computer-readable medium" as used in connection with the presently disclosed subject matter does not encompass transmission media, carrier waves, or other transitory signals.

Computer system (1500) can also include an interface (1554) to one or more communication networks (1555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include processing circuitry such as one or more Central Processing Units (CPU) (1541), Graphics Processing Units (GPU) (1542), specialized programmable processing units in the form of Field Programmable Gate Areas (FPGA) (1543), hardware accelerators for certain tasks (1544), graphics adapters (1550), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). In an example, the screen (1510) can be connected to the graphics adapter (1550). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of generating a low-poly mesh sequence for a three-dimensional (3D) model, the method comprising:
generating a visual hull based on intersections of first 3D primitives of a plurality of first silhouettes with a bounding box of the 3D model, the plurality of first silhouettes being generated by projecting the 3D model onto planes perpendicular to a number of selected view directions of the 3D model, each of the first 3D primitives being obtained by extruding a connected loop of a respective first silhouette along a view direction of the number of selected view directions that is associated with the respective first silhouette;
forming a carved mesh based on subtractions of second 3D primitives derived from positive parts of the 3D model to carve out redundant structures from the visual hull, the positive parts being obtained based on a plurality of fitting planes that slices the 3D model; and
generating the low-poly mesh sequence based on progressive simplifications of the carved mesh.

2. The method of claim 1, wherein the generating the visual hull further comprises:
forming a plurality of fitting planes, each region of the 3D model being included in a respective fitting plane of the plurality of fitting planes;
determining a plurality of candidate view directions, each of the plurality of candidate view directions being parallel to a respective pair of fitting planes and associated with a respective weight value, the respective weight value being equal to a sum of areas of the regions of the 3D model included in the respective pair of fitting planes; and
determining the number of selected view directions from the plurality candidate view directions that are associated with top k weight values, k being a positive integer.

3. The method of claim 1, wherein the generating the visual hull further comprises:
simplifying each of the plurality of first silhouettes of the 3D model through at least one of a 2D simplification or a shape-size filtering process;
extracting one or more hollow loops from a respective one of the plurality of first silhouettes;
generating one or more connected loops for the respective one of the plurality of first silhouettes by subtracting the one or more hollow loops from a 2D bounding box of the respective one of the plurality of first silhouettes; and
forming the first 3D primitives by extruding the one or more connected loops of the plurality of first silhouettes along the number of selected view directions.

4. The method of claim 1, wherein the generating the visual hull further comprises:
forming a first tentative visual hull by performing a Boolean intersection operation on a first one of the first 3D primitives and the bounding box of the 3D model;
determining a first visual difference improvement based on the first tentative visual hull and the 3D model;
in response to the visual difference improvement being larger than a threshold value, forming a second tentative visual hull by performing the Boolean intersection operation on a second one of the first 3D primitives and the first tentative visual hull; and
determining a second visual difference improvement based on the second tentative visual hull and the 3D model.

5. The method of claim 4, wherein the determining the first visual difference improvement based on the first tentative visual hull and the 3D model further comprises:
determining an initial visual difference based on an averaged pixel-wise difference between the bounding box of the 3D model and the 3D model;
determining a first visual difference based on an averaged pixel-wise difference between the first tentative visual hull and the 3D model; and
determining the first visual difference improvement by subtracting the first visual difference from the initial visual difference.

6. The method of claim 4, wherein the generating the visual hull further comprises:
determining a n-th tentative visual hull as the visual hull in response to one of (i) a n-th visual difference improvement being smaller than the threshold value and (ii) the n is equal to an upper limit N, N being a positive integer, the n-th tentative visual hull being formed by performing the Boolean intersection operation on a n-th one of the first 3D primitives and a (n−1) th tentative visual hull.

7. The method of claim 1, wherein the forming the carved mesh further comprises:
slicing the 3D model by the plurality of fitting planes, each of the plurality of fitting planes slicing the 3D model into a positive part and a negative part, the positive part of the 3D model being positioned on a positive side of the respective one of the plurality of fitting planes;
projecting each of the positive parts of the 3D model onto a corresponding fitting plane of the plurality of fitting planes to obtain a respective second silhouette;

obtaining an enlarged bounding square of the respective second silhouette on the corresponding fitting plane such that the respective second silhouette is included in the enlarged bounding square;

performing a Boolean subtraction operation to subtract the respective second silhouette from the enlarged bounding square to obtain a boundary loop of the respective second silhouette; and forming a second 3D primitive of the second 3D primitives by extruding the boundary loop of the respective second silhouette in a normal direction from the positive side of the fitting plane corresponding to the respective second silhouette.

8. The method of claim 1, wherein the forming the carved mesh further comprises:

forming a first tentative carved mesh by performing a Boolean subtraction operation on a first one of the second 3D primitives and the visual hull;

determining a first visual difference improvement based on the first tentative carved mesh and the 3D model;

in response to the visual difference improvement being larger than a threshold value, forming a second tentative carved mesh by performing the Boolean subtraction operation on a second one of the second 3D primitives and the first tentative carved mesh; and determining a second visual difference improvement based on the second tentative carved mesh and the 3D model.

9. The method of claim 8, wherein the forming the carved mesh further comprises:

determining the carved mesh being a n-th tentative carved mesh in response to one of (i) a n-th visual difference improvement being smaller than the threshold value and (ii) the n is equal to a upper limit N, N being a positive integer, the n-th tentative carved mesh being formed by performing a Boolean intersection operation on a n-th one of the second 3D primitives and a (n−1)th tentative carved mesh.

10. The method of claim 1, wherein the generating the low-poly mesh sequence further comprises:

performing an edge collapse and edge flip operation on the carved mesh progressively to generate the low-poly mesh sequence, each of the low-poly meshes in the low-poly mesh sequence including a respective number of triangles less than a user selected value T, the T being a positive integer, a number of triangles of each of the low-poly meshes is less than a number of triangles in the carved mesh.

11. The method of claim 1, further comprising:

ranking the low-poly meshes in the low-poly mesh sequence based on a number of faces and visual differences of the low-poly meshes to generate a pareto set.

12. An apparatus for generating a low-poly mesh sequence for a three-dimensional (3D) model, comprising:

processing circuitry configured to:

generate a visual hull based on intersections of first 3D primitives of a plurality of first silhouettes with a bounding box of the 3D model, the plurality of first silhouettes being generated by projecting the 3D model onto planes perpendicular to a number of selected view directions of the 3D model, each of the first 3D primitives being obtained by extruding a connected loop of a respective first silhouette along a view direction of the number of selected view directions that is associated with the respective first silhouette;

form a carved mesh based on subtractions of second 3D primitives derived from positive parts of the 3D model to carve out redundant structures from the visual hull, the positive parts being obtained based on a plurality of fitting planes that slices the 3D model; and generate the low-poly mesh sequence based on progressive simplifications of the carved mesh.

13. The apparatus of claim 12, wherein the processing circuitry configured to:

form a plurality of fitting planes, each region of the 3D model being included in a respective fitting plane of the plurality of fitting planes;

determine a plurality of candidate view directions, each of the plurality of candidate view directions being parallel to a respective pair of fitting planes and associated with a respective weight value, the respective weight value being equal to a sum of areas of the regions of the 3D model included in the respective pair of fitting planes; and determine the number of selected view directions from the plurality candidate view directions that are associated with top k weight values, k being a positive integer.

14. The apparatus of claim 12, wherein the processing circuitry configured to:

simplify each of the plurality of first silhouettes of the 3D model through at least one of a 2D simplification or a shape-size filtering process;

extract one or more hollow loops from a respective one of the plurality of first silhouettes;

generate one or more connected loops for the respective one of the plurality of first silhouettes by subtracting the one or more hollow loops from a 2D bounding box of the respective one of the plurality of first silhouettes; and form the first 3D primitives by extruding the one or more connected loops of the plurality of first silhouettes along the number of selected view directions.

15. The apparatus of claim 12, wherein the processing circuitry configured to:

form a first tentative visual hull by performing a Boolean intersection operation on a first one of the first 3D primitives and the bounding box of the 3D model;

determine a first visual difference improvement based on the first tentative visual hull and the 3D model;

in response to the visual difference improvement being larger than a threshold value, form a second tentative visual hull by performing the Boolean intersection operation on a second one of the first 3D primitives and the first tentative visual hull; and determine a second visual difference improvement based on the second tentative visual hull and the 3D model.

16. The apparatus of claim 15, wherein the processing circuitry configured to:

determine an initial visual difference based on an averaged pixel-wise difference between the bounding box of the 3D model and the 3D model;

determine a first visual difference based on an averaged pixel-wise difference between the first tentative visual hull and the 3D model; and determine the first visual difference improvement by subtracting the first visual difference from the initial visual difference.

17. The apparatus of claim 15, wherein the processing circuitry configured to:

determine a n-th tentative visual hull as the visual hull in response to one of (i) a n-th visual difference improvement being smaller than the threshold value and (ii) the n is equal to an upper limit N, N being a positive integer, the n-th tentative visual hull being formed by performing the Boolean intersection operation on a n-th one of the first 3D primitives and a (n−1) th tentative visual hull.

18. The apparatus of claim 12, wherein the processing circuitry configured to:
   slice the 3D model by the plurality of fitting planes, each of the plurality of fitting planes slicing the 3D model into a positive part and a negative part, the positive part of the 3D model being positioned on a positive side of the respective one of the plurality of fitting planes;
   project each of the positive parts of the 3D model onto a corresponding fitting plane of the plurality of fitting planes to obtain a respective second silhouette;
   obtain an enlarged bounding square of the respective second silhouette on the corresponding fitting plane such that the respective second silhouette is included in the enlarged bounding square;
   perform a Boolean subtraction operation to subtract the respective second silhouette from the enlarged bounding square to obtain a boundary loop of the respective second silhouette; and
   form a second 3D primitive of the second 3D primitives by extruding the boundary loop of the respective second silhouette in a normal direction from the positive side of the fitting plane corresponding to the respective second silhouette.

19. The apparatus of claim 12, wherein the processing circuitry configured to:
   form a first tentative carved mesh by performing a Boolean subtraction operation on a first one of the second 3D primitives and the visual hull;
   determine a first visual difference improvement based on the first tentative carved mesh and the 3D model;
   in response to the visual difference improvement being larger than a threshold value, form a second tentative carved mesh by performing the Boolean subtraction operation on a second one of the second 3D primitives and the first tentative carved mesh; and
   determine a second visual difference improvement based on the second tentative carved mesh and the 3D model.

20. The apparatus of claim 19, wherein the processing circuitry configured to:
   determine the carved mesh being a n-th tentative carved mesh in response to one of (i) a n-th visual difference improvement being smaller than the threshold value and (ii) the n is equal to a upper limit N, N being a positive integer, the n-th tentative carved mesh being formed by performing a Boolean intersection operation on a n-th one of the second 3D primitives and a (n−1)th tentative carved mesh.

* * * * *